(12) United States Patent
Park et al.

(10) Patent No.: US 10,139,673 B2
(45) Date of Patent: Nov. 27, 2018

(54) DISPLAY PANEL AND MOTHER SUBSTRATE FOR DISPLAY PANELS

(71) Applicant: Samsung Display Co., Ltd., Yongin-si (KR)

(72) Inventors: Seung Won Park, Seoul (KR); Dae Young Lee, Seoul (KR); Dong Eon Lee, Seoul (KR); Dae Hwan Jang, Seoul (KR); Gug Rae Jo, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 65 days.

(21) Appl. No.: 15/358,839

(22) Filed: Nov. 22, 2016

(65) Prior Publication Data

US 2017/0307935 A1 Oct. 26, 2017

(30) Foreign Application Priority Data

Apr. 26, 2016 (KR) .................. 10-2016-0050543

(51) Int. Cl.
*G02F 1/1335* (2006.01)
*G02F 1/1368* (2006.01)
(Continued)

(52) U.S. Cl.
CPC ...... *G02F 1/133536* (2013.01); *G02F 1/1368* (2013.01); *G02F 1/134309* (2013.01); *G02F 1/13439* (2013.01); *G02F 1/133345* (2013.01); *G02F 1/133512* (2013.01); *G02F 1/133514* (2013.01); *G02F 1/136286* (2013.01); *G02F 2001/133548* (2013.01);
(Continued)

(58) Field of Classification Search
CPC ................................................ G02F 1/133536
See application file for complete search history.

(56) References Cited

U.S. PATENT DOCUMENTS 5,850,276 A * 12/1998 Ochi ................. G02F 1/133526
349/158
8,525,958 B2 9/2013 Lee
(Continued)

FOREIGN PATENT DOCUMENTS

KR 10-2015-0001022 1/2015
KR 10-2015-0008590 1/2015

OTHER PUBLICATIONS

Viheriala et al., "Nanoimprint Lithography—Next Generation Nanopatterning Methods for Nanophotonics Fabrication", Recent Optical and Photonic Technologies, Jan. 2010, pp. 275-298, InTech, Croatia.

*Primary Examiner* — Edmond Lau
(74) *Attorney, Agent, or Firm* — H.C. Park & Associates, PLC

(57) ABSTRACT

Provided is a display panel including a base substrate which includes a display area and a non-display area, a polarizing member disposed on a surface of the base substrate and including a plurality of grid patterns overlapping the display area and a reflective pattern overlapping the non-display area, and a pixel array layer which overlaps the polarizing member and is insulated from the polarizing member, wherein a first height from the surface of the base substrate to an upper surface of the reflective pattern is different from a second height from the surface of the base substrate to upper surfaces of the grid patterns.

9 Claims, 27 Drawing Sheets

(51) Int. Cl.
*G02F 1/1343* (2006.01)
*G02F 1/1362* (2006.01)
*G02F 1/1333* (2006.01)

(52) U.S. Cl.
CPC ............ *G02F 2001/136231* (2013.01); *G02F 2201/121* (2013.01); *G02F 2201/123* (2013.01)

(56) References Cited

U.S. PATENT DOCUMENTS

| | | | | |
|---|---|---|---|---|
| 2009/0273102 A1* | 11/2009 | Nogami | ................ | H01L 23/544 257/797 |
| 2010/0045907 A1* | 2/2010 | Lee | ....................... | G02F 1/1333 349/110 |
| 2013/0153534 A1* | 6/2013 | Resnick | ............. | B29D 11/0074 216/24 |
| 2014/0055715 A1* | 2/2014 | Lee | ................... | G02F 1/133528 349/62 |

* cited by examiner

DISPLAY PANEL AND MOTHER SUBSTRATE FOR DISPLAY PANELS

CROSS-REFERENCE TO RELATED APPLICATION

This application claims priority from and the benefit of Korean Patent Application No. 10-2016-0050543, filed on Apr. 26, 2016, the disclosure of which is incorporated herein by reference in its entirety.

BACKGROUND

Field

Exemplary embodiments relate to a display panel and a mother substrate for display panels.

Discussion Of The Background

Generally, a grid of metallic wires separated from each other selectively transmits or reflects polarizations of electronic waves. That is, when an arrangement distance of the metallic wires is shorter than that of a wavelength of an incident electronic wave, a polarization component parallel to the metallic wires is reflected, and a polarization component perpendicular to the metallic wires is transmitted. Using this phenomenon, a polarizer having superior polarization efficiency, high transmittance, and a wide viewing angle can be manufactured. This polarizer is called a wire grid polarizer.

Using the wire grid polarizer, a reflective polarizing plate can be used. The reflective polarizing plate is more resistant to degradation than an absorptive polarizing plate in the form of a film. In addition, the reflective polarizing plate is of an in-cell type that can be formed integrally with, for example, a display panel.

Accordingly, the reflective polarizing plate is being employed in various display devices including liquid crystal displays. That is, the range of application of the reflective polarizing plate is being gradually expanded.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display panel and a mother substrate for display panels which can reduce the number of masks used.

Additional aspects will be set forth in the detailed description which follows, and, in part, will be apparent from the disclosure, or may be learned by practice of the inventive concept.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

An exemplary embodiment discloses a display panel that includes a base substrate which includes a display area and a non-display area, a polarizing member disposed on a surface of the base substrate and including a plurality of grid patterns overlapping the display area and a reflective pattern overlapping the non-display area, and a pixel array layer which overlaps the polarizing member and is insulated from the polarizing member, wherein a first height from the surface of the base substrate to an upper surface of the reflective pattern is different from a second height from the surface of the base substrate to upper surfaces of the grid patterns.

An exemplary embodiment also discloses a mother substrate that includes a base substrate which includes a panel area having a display area and a non-display area, an align key area, and a surrounding area of the panel area and the align key area, and a polarizing member which is located on a surface of the base substrate and comprises a plurality of grid patterns overlapping the display area, a reflective pattern overlapping the non-display area, and an align key overlapping the align key area, wherein a first height from the surface of the base substrate to an upper surface of the reflective pattern is different from a second height from the surface of the base substrate to upper surfaces of the grid patterns, and a third height from the surface of the base to an upper surface of the align key is equal to the first height or the second height.

Other features and aspects will be apparent from the following detailed description, the drawings, and the claims.

It is to be understood that both the foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
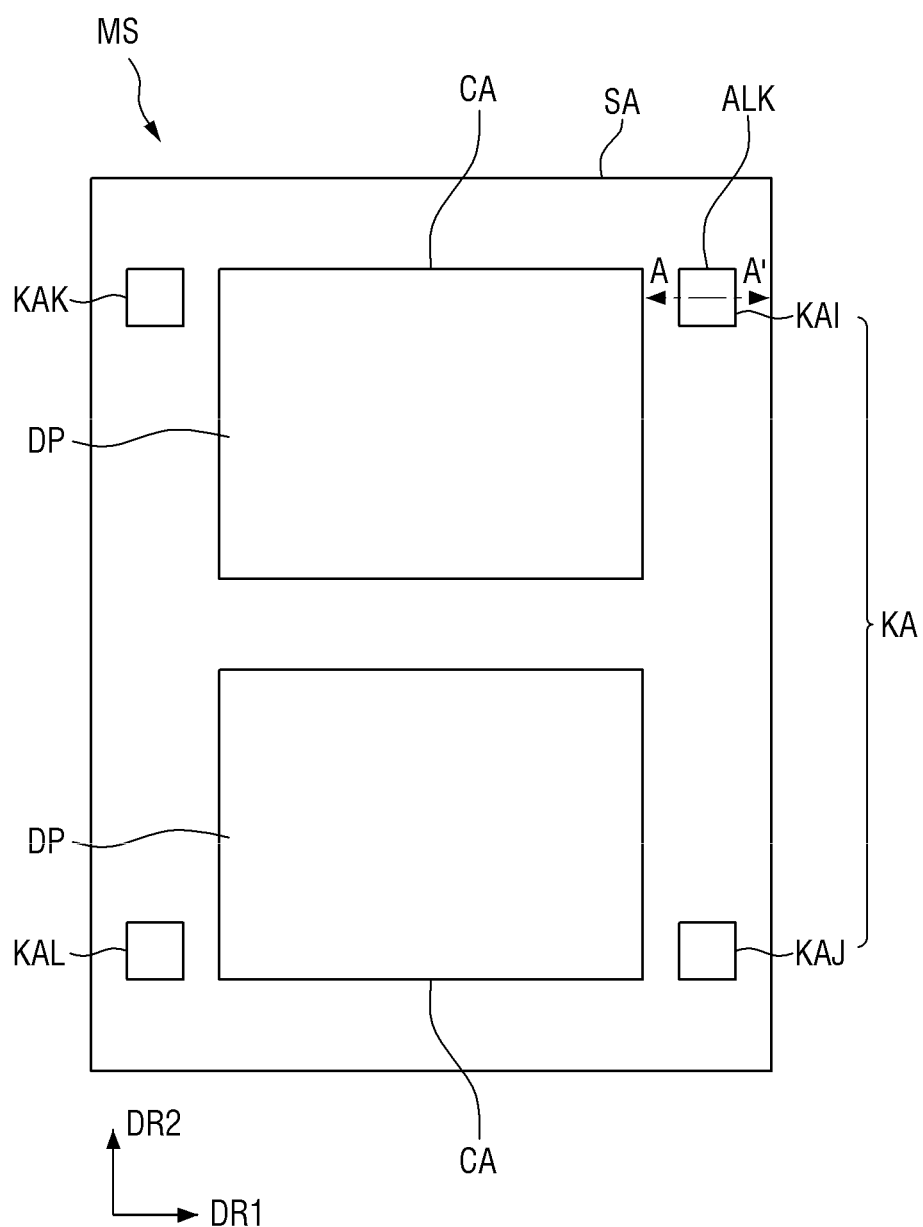
FIG. 1 is a schematic plan view of a mother substrate for display panels according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a schematic plan view of a mother substrate for display panels according to an exemplary embodiment.

Referring to FIG. 1, the mother substrate MS for display panels may include a plurality of panel areas CA, a plurality of align key areas KA, and a surrounding area SA.

In an example, the mother substrate MS may be shaped like a rectangle having a pair of sides which are parallel to a first direction DR1 and another pair of sides which are parallel to a second direction DR2 perpendicular to the first direction DR1.

The mother substrate MS may include a plurality of panel areas CA. A display panel DP may be formed in each of the panel areas CA, and the display panel DP may include a plurality of pixels.

Each of the align key areas KA is an area in which an align key ALK is formed. In an exemplary embodiment, the align key areas KA may include first through fourth align key areas KAI, KAJ, KAK and KAL.

In FIG. 1, the first align key area KAI may be located adjacent to an upper right corner of the mother substrate MS, and the second align key area KAJ may be located adjacent to a lower right corner of the mother substrate MS. In addition, the third align key area KAK may be located adjacent to an upper left corner of the mother substrate MS, and the fourth align key area KAL may be located adjacent to a lower left corner of the mother substrate MS. The align key ALK may be located in each of the first through fourth align key areas KAI, KAJ, KAK and KAL. However, the positions and number of the align key areas KA are not limited to the above example and can be changed to various positions and numbers. The align key ALK may be used as a basis for aligning at least two elements with each other in a process of manufacturing the mother substrate MS. For example, if the mother substrate MS includes a first mother substrate and a second mother substrate bonded to the first mother substrate, the first mother substrate and the second mother substrate may be aligned with each other based on the align key ALK.

The mother substrate MS may be cut along the boundary of each panel area CA. Accordingly, the display panel DP may be separated from the mother substrate MS. After the separation of the display panel DP from the mother substrate MS, the surrounding area SA and the align key areas KA may remain in the mother substrate MS. The separated display panel DP may be assembled with a printed circuit board (PCB) which controls the display panel DP and a backlight unit which provides light to the display panel DP, thereby forming a display device.

The display panel DP may be any one of a twisted nematic (TN) display panel, a vertical alignment (VA) display panel, a patterned vertical alignment (PVA) display panel, an in-plane switching (IPS) display panel, a fringe-field switching (FFS) display panel, and a plane-to-line switching (PLS) display panel. For ease of description, the PLS display panel will hereinafter be described as an example of the display panel DP.

Figure 2:
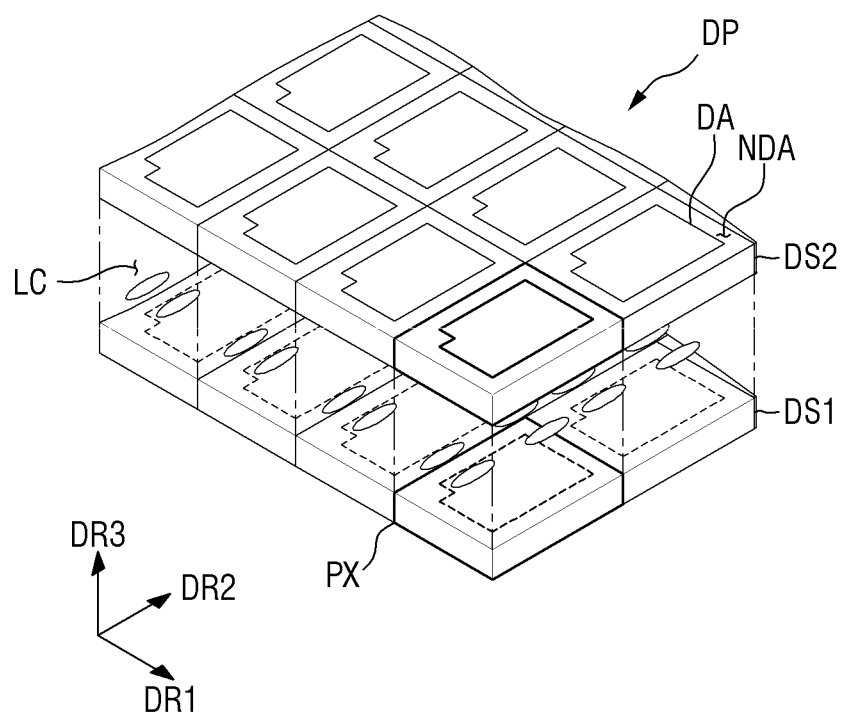
FIG. 2 is a schematic partial perspective view of a display panel separated from a panel area illustrated in FIG. 1.

FIG. 2 is a schematic partial perspective view of the display panel DP illustrated in FIG. 1.

Referring to FIG. 2, the display panel DP having a plurality of pixels PX may include a first display substrate DS1, a second display substrate DS2, and a liquid crystal layer LC. The first display substrate DS1 and the second display substrate DS2 may be separated from each other in a thickness direction (hereinafter, referred to as a third direction DR3), and the liquid crystal layer LC may be disposed between the first display substrate DS1 and the second display substrate DS2.

The display panel DP may include a plurality of display areas DA and a non-display area NDA adjacent to the display areas DA. The display areas DA may transmit light provided from under the first display substrate DS1 (e.g., light generated by a backlight unit) and the non-display area NDA may block the light generated by the backlight unit.

Figure 3:
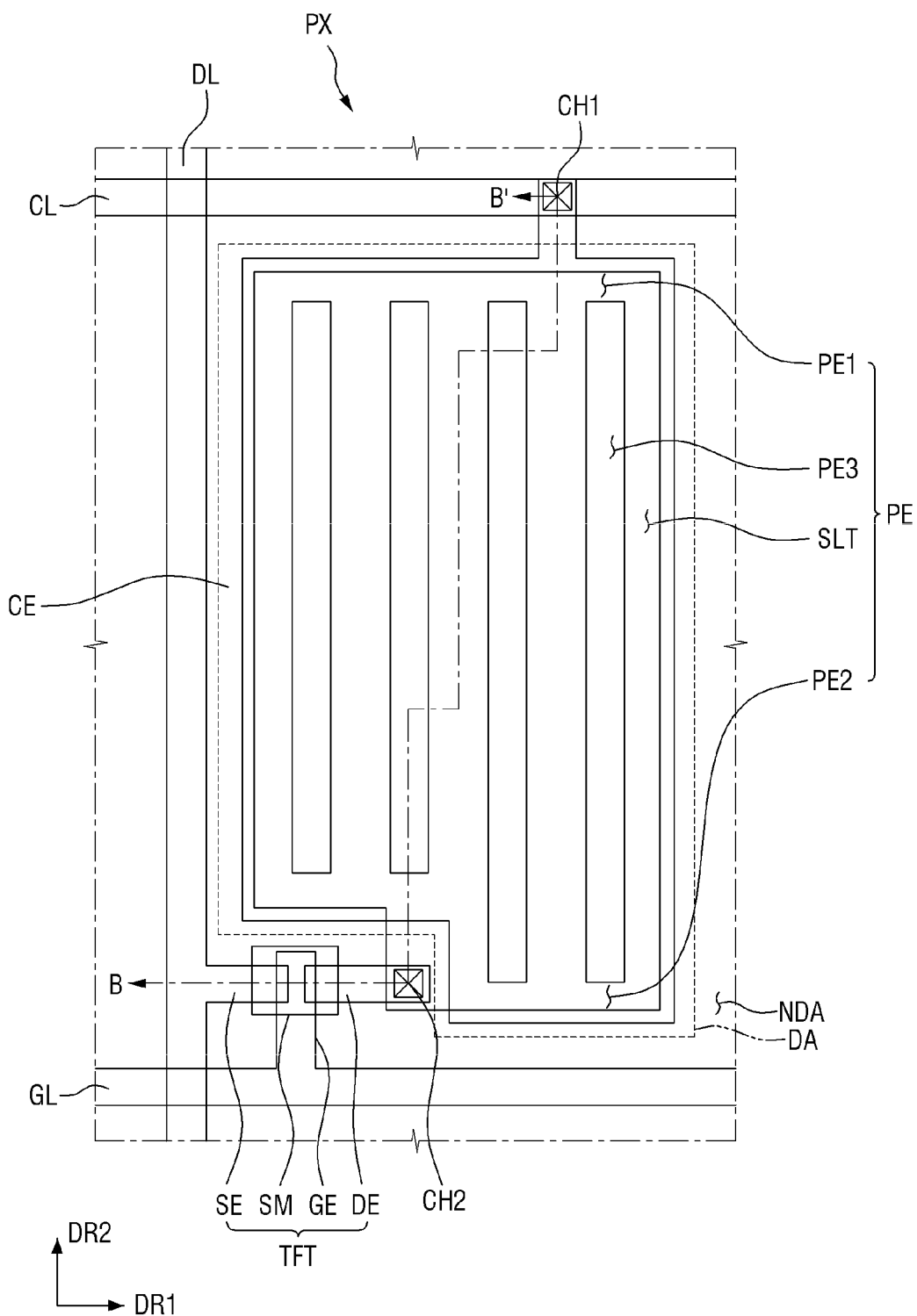
FIG. 3 is an exemplary embodiment of a plan view of a pixel illustrated in FIG. 2.
Figure 4:
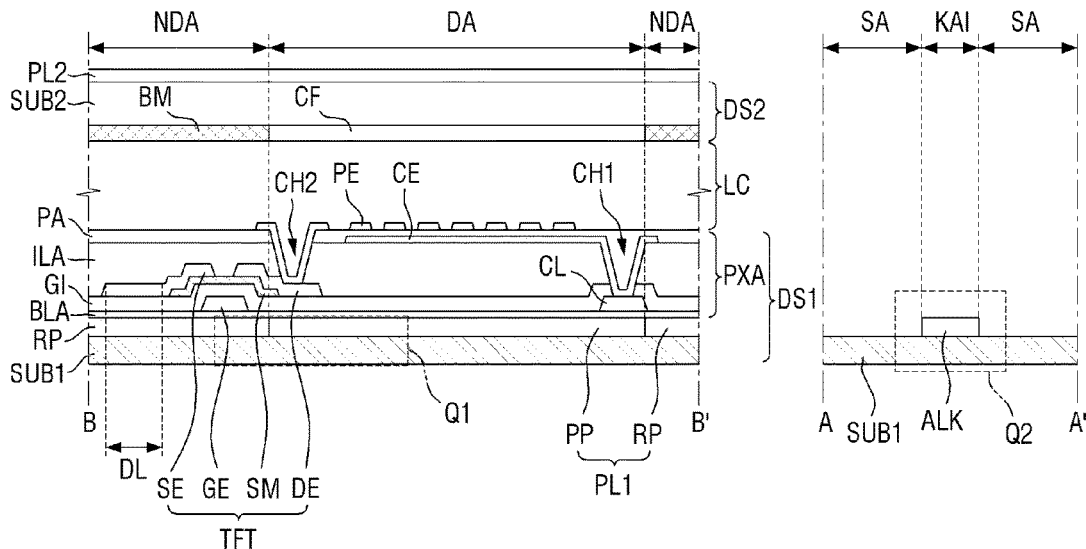
FIG. 4 is a cross-sectional view taken along the line A-A' of FIG. 1 and the line B-B' of FIG. 3.

FIG. 3 is an exemplary plan view of a pixel PX illustrated in FIG. 2. FIG. 4 is a cross-sectional view taken along the line A-A' of FIG. 1 and the line B-B' of FIG. 3.

Referring to FIGS. 1 through 4, the first display substrate DS1 may include a first base substrate SUB1, a first polarizing member PL1, a base insulating layer BLA, and a pixel array layer PXA.

The first display substrate DS1 will hereinafter be described.

The first base substrate SUB1 may include an insulating substrate. The insulating substrate may be transparent. Here, when the insulating substrate is transparent, it may be 100% transparent or semi-transparent enough to meet a transmittance level specified in design requirements. For example, the first base substrate SUB1 may be a glass substrate, a quartz substrate, or a transparent resin substrate. In addition, the first base substrate SUB1 may include polymer or plastic having high thermal resistance. In some exemplary embodiments, the first base substrate SUB1 may have flexibility. That is, the first base substrate SUB1 may be a deformable substrate that can be rolled, folded or bent. In some exemplary embodiments, the first base substrate SUB1 may consist of an insulating substrate and a layer (e.g., an insulating layer) stacked on the insulating substrate. The first base substrate SUB1 may include the display areas DA and the non-display area NDA from the perspective of the display panel DP and include the panel areas CA, each having the display areas DA and the non-display area NDA, the align key areas KA and the surrounding area SA from the perspective of the mother substrate MS.

The first polarizing member PL1 may be located on a surface of the first base substrate SUB1. The first polarizing member PL1 may include a reflective part RP and a polarizing part PP.

The polarizing part PP may be located in a display area DA of the first base substrate SUB1. The polarizing part PP may polarize light that transmits through the first base substrate SUB1 and include a plurality of grid patterns (not illustrated). The grid patterns may be arranged regularly and parallel to each other along a direction. The grid patterns may be arranged with a period shorter than a wavelength of visible light. In an example, the grid patterns may be arranged with a period of approximately 400 nm or less. In particular, the arrangement period of the grid patterns may be approximately 200 nm or less, for example, 100 nm or less. A direction in which the grid patterns are arranged may be a direction parallel, perpendicular or oblique to a gate line GL which will be described later. The light proceeds while oscillating in irregular directions and in a direction perpendicular to its proceeding direction. Of the light incident upon the grid patterns, a portion oscillating in a direction perpendicular to the direction in which the grid patterns extend passes through the polarizing part PP, and the other portion may be reflected by the grid patterns. That is, only P-polarized light transmits through the grid patterns, and S-polarized light is reflected by the grid patterns. As a result, only the P-polarized light proceeds upward.

The reflective part RP may be located in the non-display area NDA of the first base substrate SUB1. An area in which the reflective part RP may be located may correspond to an area in which a light-blocking member BM may be formed. The reflective part RP may include a reflective pattern (not illustrated) which reflects light. Using the reflective pattern, the reflective part RP can recycle light, thereby increasing light efficiency.

For example, light reflected by the reflective pattern of the reflective part RP may be reflected again by a reflective plate included in the backlight unit (not illustrated) under the reflective part RP. As a result, the light may reenter the first polarizing member PL1. This process may be repeated. That is, the reflective pattern of the reflective part RP may reflect light incident upon the non-display area NDA, so that the incident light can be reused. Accordingly, the amount of light that reenters the display area DA can be increased, which, in turn, improves the light-use efficiency of the first polarizing member PL1.

The S-polarized light reflected by the polarizing part PP may be scattered by a light guide plate (LGP) included in the backlight unit (not illustrated) under the polarizing part PP. After the polarization of the S-polarized light is offset in this way, the light may be reflected again by the reflective plate included in the backlight unit. As a result, the light may reenter the first polarizing member PL1. This process may be repeated. Accordingly, the light efficiency of the first polarizing member PL1 can be further improved, and the improved light efficiency can reduce power consumption and/or enhance luminance.

The first polarizing member PL1 will be described in greater detail later.

The base insulating layer BLA may be located on the first polarizing member PL1. The base insulating layer BLA may be made of an insulating material and cover the whole of the first polarizing member PL1.

The pixel array layer PXA may be located on the base insulating layer BLA. The pixel array layer PXA may include the gate line GL, a data line DL, a thin-film transistor TFT which overlaps the reflective part RP, and a pixel electrode PE which overlaps the polarizing part PP. The pixel array layer PXA may further include a common voltage line CL, a first insulating layer ILA, a second insulating layer PA, and a common electrode CE.

The gate line GL, a gate electrode GE of the thin-film transistor TFT, and the common voltage line CL may be located on the base insulating layer BLA.

The gate line GL may deliver a gate signal and extend substantially in the first direction DR1. The gate electrode GE may protrude from the gate line GL and may be connected to the gate line GL. The gate electrode GE and the gate line GL may be made of the same material and have the same layer structure. The gate line GL and the gate electrode GE may be made of aluminum (Al)-based metal such as aluminum or an aluminum alloy, silver (Ag)-based metal such as silver or a silver alloy, copper (Cu)-based metal such as copper or a copper alloy, molybdenum (Mo)-based metal such as molybdenum or a molybdenum alloy, chrome (Cr), titanium (Ti), or tantalum (Ta). In addition, the gate line GL and the gate electrode GE may have a single layer structure or a multilayer structure composed of at least two conductive layers with different physical characteristics.

The common voltage line CL may be made of the same material as the gate line GL and have the same layer structure as the gate line GL. A gate insulating layer GI may be located on the common voltage line CL, the gate line GL, and the gate electrode GE. The gate insulating layer GI may be made of an insulating material. In an example, the gate insulating layer GI may be made of an inorganic insulating material such as silicon nitride, silicon oxide, or silicon oxynitride. The gate insulating layer GI may have a single layer structure or a multilayer structure composed of at least two conductive layers with different physical characteristics.

A semiconductor layer SM of the thin-film transistor TFT may be located on the gate insulating layer GI, and at least part of the semiconductor layer SM may overlap the gate electrode GE. The semiconductor layer SM may include amorphous silicon, polycrystalline silicon, or an oxide semiconductor.

A source electrode SE of the thin-film transistor TFT, a drain electrode DE of the thin-film transistor TFT, and the data line DL may be located on the gate insulating layer GI. The data line DL may deliver a data voltage and extend substantially in the second direction DR2 intersecting the first direction DR1 to cross the gate line GL.

The source electrode SE may be connected to the data line DL and may protrude from the data line DL onto the gate electrode GE.

The drain electrode DE may be separated from the source electrode SE. The drain electrode DE and the source electrode SE may contact the semiconductor layer SM, and at least part of each of the drain electrode DE and the source electrode SE may overlap the semiconductor layer SM.

Each of the data line DL, the source electrode SE and the drain electrode DE may be made of aluminum, copper, silver, molybdenum, chrome, titanium or an alloy of these metals. In addition, each of the data line DL, the source electrode SE and the drain electrode DE may have a multilayer structure composed of a lower layer (not illustrated) made of refractory metal and an upper layer (not illustrated) made of a material with low resistivity.

The gate electrode GE, the source electrode SE and the drain electrode DE may form one switching device, i.e., one thin-film transistor TFT together with the semiconductor layer SM. The thin-film transistor TFT may overlap the non-display area NDA and the reflective part RP.

The first insulating layer ILA may be located on the gate insulating layer GI, the semiconductor layer SM, the source electrode SE and the drain electrode DE. The first insulating layer ILA may be made of an organic insulating material or an inorganic insulating material. In some embodiments, the first insulating layer ILA may provide a flat surface.

The common electrode CE may be disposed on the first insulating layer ILA. The common electrode CE may be made of a transparent conductive material such as indium tin oxide (ITO), indium zinc oxide (IZO), indium tin zinc oxide (ITZO) or aluminum-doped zinc oxide (AZO). The common electrode CE may be connected to the common voltage line CL by a first hole CH1 which penetrates through the gate insulating layer GI and the first insulating layer ILA, but the present disclosure is not limited thereto. In another embodiment, the common electrode CE may be placed on the second base substrate SUB2 depending on the operation mode of the pixel PX.

The second insulating layer PA may be located on the first insulating layer ILA to cover the common electrode CE. The second insulating layer PA may include an inorganic insulating material such as silicon oxide, silicon nitride or silicon oxynitride.

The pixel electrode PE may be disposed on the second insulating layer PA to overlap the common electrode CE. Most of the pixel electrode PE may overlap the display area DA. The pixel electrode PE may overlap the polarizing part PP or the grid patterns of the polarizing part PP. The pixel electrode PE may be connected to the drain electrode DE by a second hole CH2 which penetrates through the first insulating layer ILA and the second insulating layer PA. The pixel electrode PE may be made of a transparent conductive material such as ITO, IZO, ITZO, or AZO.

The pixel electrode PE may include a plurality of slits SLT. In an exemplary embodiment, the pixel electrode PE includes a first horizontal part PE1, a second horizontal part PE2 which may be separated from the first horizontal part PE1, and a plurality of vertical parts PE3 which connect the first horizontal part PE1 and the second horizontal part PE2. The slits SLT may be located between the vertical parts PE3. However, the shape of the pixel electrode PE is not limited to the above example and can be changed to various shapes. Further, in some other embodiments, the slits SLT may be formed not in the pixel electrode PE but in the common electrode CE.

Although not illustrated in the drawings, an alignment layer may be located on the pixel electrode PE and the second insulating layer PA. The alignment layer may be a horizontal alignment layer and have a fixed rubbing direction. However, the present disclosure is not limited thereto, and the alignment layer may also include a photoreactive material so as to be photo-aligned.

The second display substrate DS2 will hereinafter be described.

The second display substrate DS2 may include the second base substrate SUB2, the light-blocking member BM, and a color filter CF.

Like the first base substrate SUB1, the second base substrate SUB2 may be a transparent insulating substrate. In addition, the second base substrate SUB2 may include polymer or plastic having high thermal resistance. In some embodiments, the second base substrate SUB2 may be flexible.

The light-blocking member BM may be located between the second base substrate SUB2 and the liquid crystal layer LC, more specifically, on a surface of the second base substrate SUB2 which faces the first base substrate SUB1. The light-blocking member BM may be located on the surface of the second base substrate SUB2 to overlap the non-display area NDA. The light-blocking member BM may cover the non-display area NDA when seen from above. In some embodiments, the non-display area NDA may be defined as an area of the first base substrate SUB1 which overlaps the light-blocking member BM, and the display area DA may be defined as an area of the first base substrate SUB1 in which the light-blocking member BM is not disposed. However, the present disclosure is not limited thereto, and the area which overlaps the light-blocking member BM and the non-display area NDA can also be at least partially different. In some embodiments, the light-blocking member BM may partially or entirely overlap the thin-film transistor TFT and may further overlap the gate line GL and the data line DL.

The color filter CF may be disposed on the surface of the second base substrate SUB2 to overlap the display area DA and may cover the display area DA when seen from above. The color filter CF may display one of three primary colors, i.e., red, green and blue. However, the colors that can be displayed by the color filter CF are not limited to the three primary colors of red, green and blue. That is, the color filter CF can also display any one of cyan, magenta, yellow, and white. In some embodiments, the color filter CF may partially or entirely overlap the pixel electrode PE.

A second polarizing member PL2 may be located on the second base substrate SUB2. In some embodiments, the second polarizing member PL2 may be located on the other surface of the second base substrate SUB2. The second polarizing member PL2 may be a stretchable polarizing film. The stretchable polarizing film may include a polyvinyl alcohol (PVA)-based polarizer to which an iodine compound or a dichromatic polarizing material may be adsorbed and which may be stretched in a direction and a triacetyl cellulose protective film which protects the polarizer.

Although not illustrated in the drawings, an alignment layer may be located on the light-blocking film BM and the color filter CF. The alignment layer may be a horizontal alignment layer and have a fixed rubbing direction. However, the present disclosure is not limited thereto, and the alignment layer may also include a photoreactive material so as to be photo-aligned.

The liquid crystal layer LC may be located between the first display substrate DS1 and the second display substrate DS2 and include liquid crystal molecules having dielectric anisotropy. When a gate signal is transmitted to the gate line GL, the thin-film transistor TFT may be turned in response to the gate signal. In addition, a data voltage applied to the data line DL may be delivered to the pixel electrode PE via the drain electrode DE. Also, the common electrode CE receives a common voltage through the common voltage line CL. Accordingly, an electric field may be formed between the pixel electrode PE and the common electrode CE. The electric field causes the liquid crystal molecules of the liquid crystal layer LC to rotate in a certain direction between the first display substrate DS1 and the second display substrate DS2, thereby transmitting or blocking light. Here, when the liquid crystal molecules rotate, they may not only substantially rotate, but also the alignment of the liquid crystal molecules may be changed by the electric field.

The align key ALK may be disposed on the first base substrate SUB1 to correspond to the first align key area KA1. The align key ALK may be used as a basis for aligning the first display substrate DS1 and the second display substrate DS2 with each other. For example, the align key ALK may enable the reflective part RP to be aligned more accurately with the non-display area NDA or the light-blocking member BM and the polarizing part PP to be aligned more accurately with the display area DA or the color filter CF.

Figure 5:
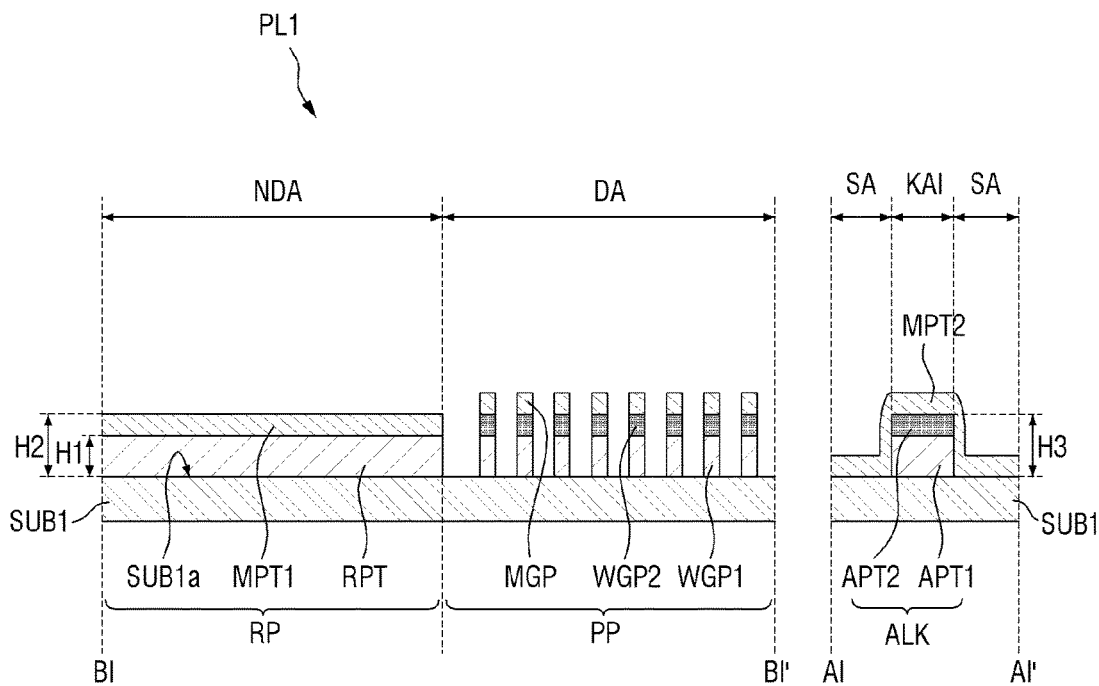
FIG. 5 is an enlarged cross-sectional view of portions Q1 and Q2 of FIG. 4.

FIG. 5 is an enlarged cross-sectional view of portions Q1 and Q2 of FIG. 4. The lines AI-AI' and BI-BI' of FIG. 5 are part of the lines A-A' and B-B' of FIG. 4, respectively.

Referring to FIGS. 4 and 5, the reflective part RP of the first polarizing member PL1 may overlap the non-display area NDA and include a reflective pattern RPT located on a surface SUB1a of the first base substrate SUB1. The reflective pattern RPT may be made of a first material having high reflectivity. In an example, the reflective pattern RPT may be made of one of aluminum, gold, silver, copper, chrome, iron, nickel, molybdenum, and an alloy of these metals. In some embodiments, the reflective pattern RPT may be made of aluminum having relatively high reflectivity among the above metals.

A first residual mask pattern MPT1 may be located on the reflective pattern RTP. The first residual mask pattern MPT1 may be a residual pattern of a hard mask layer formed in a manufacturing process. The first residual mask pattern MPT1 may include an inorganic insulating material such as silicon nitride or silicon oxide.

The polarizing part PP of the first polarizing member PL1 may overlap the display area DA and include lower grid patterns WGP1 located on the surface SUB1a of the first base substrate SUB1 and upper grid patterns WGP2 located on the lower grid patterns WGP1. The lower grid patterns WGP1 may be made of a material having high reflectivity. In particular, the lower grid patterns WGP1 may be made of the same material (i.e., the first material) as the reflective pattern RPT. If a height from the surface SUB1a of the first base substrate SUB1 to an upper surface of the reflective pattern RPT may be a first height H1, a height from the surface SUB1a of the first base substrate SUB1 to an upper surface of each of the lower grid patterns WGP1 may be equal to the first height H1. Here, when the height from the surface SUB1a of the first base substrate SUB1 to the upper surface of each of the lower grid patterns WGP1 may be equal to the first height H1, physical values of the heights may be equal, or any difference between the physical values may be within a range determined in view of process margins.

The upper grid patterns WGP2 may be located on the lower grid patterns WGP1. The upper grid patterns WGP2 may be made of a second material having high reflectivity. In an example, the second material may be any one of aluminum, gold, silver, copper, chrome, iron, nickel, molybdenum, titanium, and an alloy of these metals. In an example, when the first material is aluminum, the second material may be any one of molybdenum, titanium, and an alloy of these metals.

In some embodiments, the second material that forms the upper grid patterns WGP2 may be different from the first material that forms the lower grid patterns WGP1. In some embodiments, an etching rate of the first material that forms the lower grid patterns WGP1 and the reflective pattern RPT may be different from an etching rate of the second material that forms the upper grid patterns WGP2. For example, the etching rate of the first material may be higher than that of the second material under first conditions. Assuming that the etching rate of the first material is more than twice the etching rate of the second material, the etching speed of the first material may be more than twice as high as that of the second material in an etching process performed under the first conditions. The etching rate of the first material may be tens to hundreds of times higher than the etching rate of the second material. That is, the etching speed of the first material may be tens to hundreds of times higher than that of the second material for a first etchant under the first conditions. In other words, the etching speed of the second material may be significantly lower than that of the first material under the first conditions.

Similarly, the etching rate of the second material may be higher than that of the first material under second conditions which are different from the first conditions. That is, the etching speed of the second material may be tens to hundreds of times higher than that of the first material for a second etchant under the second conditions. In other words, the etching speed of the first material may be significantly lower than that of the second material under the second conditions. In an exemplary embodiment, a difference between the first conditions and the second conditions may be an etchant.

A second height H2 from the surface SUB1a of the first base substrate SUB1 to an upper surface of each of the upper grid patterns WGP2 may be greater than the first height H1. In other words, the upper surface of the reflective pattern RPT may be lower than the upper surface of each of the upper grid patterns WGP2.

Residual mask grid patterns MGP may be located on the upper grid patterns WGP2. Like the first residual mask pattern MPT1, the residual mask grid patterns MGP may be residual patterns of the hard mask layer formed in the manufacturing process. The residual mask grid patterns MGP may include the same material as the first residual mask pattern MPT1.

The align key ALK may overlap the first align key area KAI and include a lower align key pattern APT1 located on the surface SUB1a of the first base substrate SUB1 and an upper align key pattern APT2 located on the lower align key pattern APT1.

The lower align key pattern APT1 may be made of a material having high reflectivity. In particular, the lower align key pattern APT1 may be made of the same material (i.e., the first material) as the reflective pattern RPT and the lower grid patterns WGP1. A height from the surface SUB1a of the first base substrate SUB1 to an upper surface of the lower align key pattern APT1 may be equal to the first height H1. That is, the height of the lower align key pattern APT1, the height of the reflective pattern RPT, and the height of each of the lower grid patterns WGP1 may be equal.

The upper align key pattern APT2 may be located on the lower align key pattern APT1. The upper align key pattern APT2 may be made of the same material (i.e., the second material) as the upper grid patterns WGP2.

A third height H3 from the surface SUB1a of the first base substrate SUB1 to an upper surface of the upper align key pattern APT2 may be greater than the first height H1. In other words, the upper surface of the reflective pattern RPT may be lower than the upper surface of the upper align key pattern APT2. In addition, the third height H3 may be equal to the second height H2. That is, the height from the surface SUB1a of the first base substrate SUB1 to the upper surface of the upper align key pattern APT2 may be equal to the height from the surface SUB1a of the first base substrate SUB1 to the upper surface of each of the upper grid patterns WGP2.

A second residual mask pattern MPT2 may be located on the upper align key pattern APT2, and part of the second residual mask pattern MPT2 may extend to the surrounding area SA. Like the first residual mask pattern MPT1 and the residual mask grid patterns MGP, the second residual mask pattern MPT2 may be a residual pattern of the hard mask layer formed in the manufacturing process. The second residual mask pattern MPT2 may include the same material as the first residual mask pattern MPT1 and the residual mask grid patterns MGP.

Figure 6:
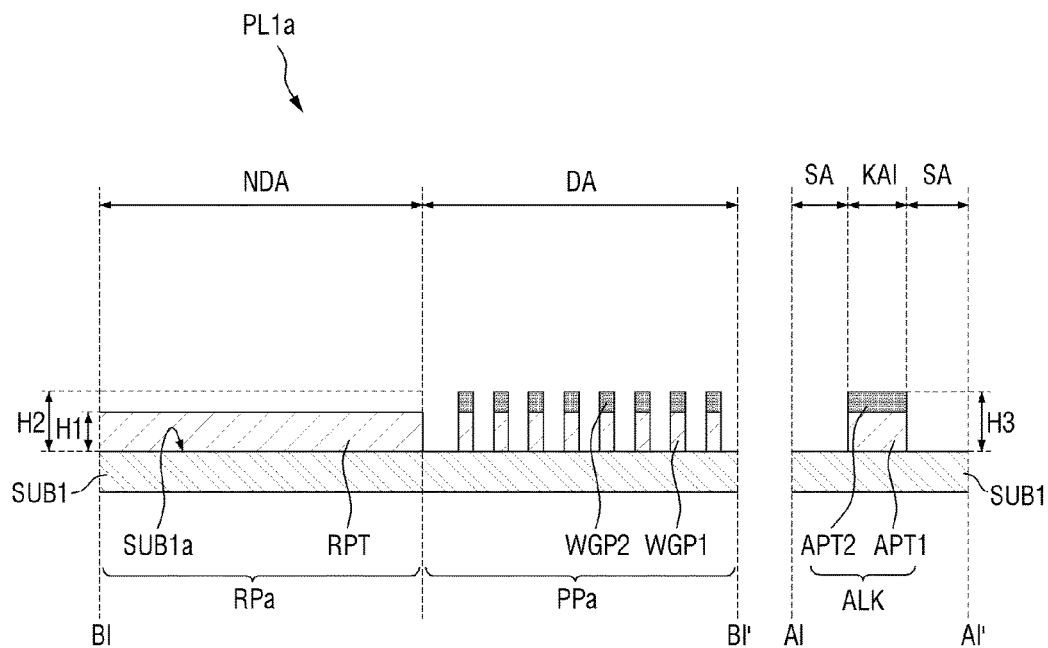
FIG. 6 is a cross-sectional view of a modified exemplary embodiment of a first polarizing member and an align key illustrated in FIG. 5.

FIG. 6 is a cross-sectional view of a modified embodiment of the first polarizing member PL1 and the align key ALK illustrated in FIG. 5.

Referring to FIGS. 5 and 6, a first polarizing member PL1a according to the current embodiment includes a reflective part RPa and a polarizing part PPa. The first polarizing member PL1a may be different from the first polarizing part PL1 of FIG. 5 in that a first residual mask pattern MPT1 is not located on a reflective pattern RTP of the reflective part RPa, that residual mask grid patterns MGP are not located on upper grid patterns WGP2 of the polarizing part PPA, and that a second residual mask pattern MPT2 is not additionally located on an alignment key ALK. Other elements may be substantially identical to those described above with reference to FIG. 5, and thus a detailed description thereof is omitted.

Figure 7:
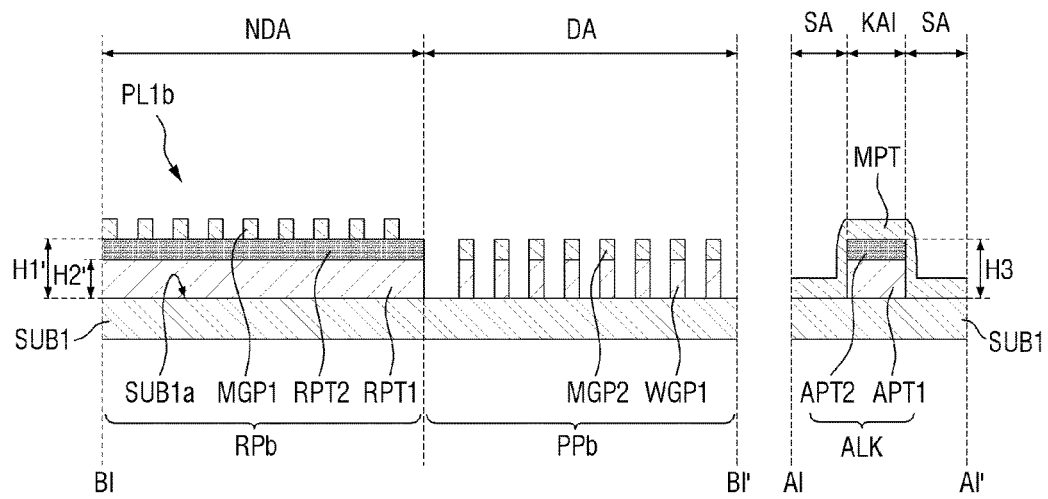
FIG. 7 is a cross-sectional view of another exemplary embodiment of the first polarizing member and the align key illustrated in FIG. 5.

FIG. 7 is a cross-sectional view of another embodiment of the first polarizing member PL1 and the align key ALK illustrated in FIG. 5.

Referring to FIGS. 5 and 7, a first polarizing member PL1b according to the current embodiment includes a reflective part RPb and a polarizing part PPb. The reflective part RPb of the first polarizing member PL1b may overlap a non-display area NDA and include a lower reflective pattern RPT1 located on a surface SUB1a of a first base substrate SUB1 and an upper reflective pattern RPT2 located on the lower reflective pattern RPT1. The lower reflective pattern RPT1 may include the first material described above with reference to FIG. 5, and the upper reflective pattern RPT2 may include the second material described above with reference to FIG. 5.

First residual mask grid patterns MGP1 which are residual patterns of a hard mask layer may be located on the upper reflective pattern RPT2. Like lower grid patterns WGP1 which will be described later, the first residual mask grid patterns MGP1 may be arranged in a grid shape.

The polarizing part PPb of the first polarizing member PL1b may overlap a display area DA and include the lower grid patterns WGP1 located on the surface SUB1a of the first base substrate SUB1. That is, unlike the polarizing part PP of FIG. 5, the polarizing part PPb according to the current embodiment may not have upper grid patterns WGP2 (see FIG. 5) located on the lower grid patterns WGP1. The lower grid patterns WGP1 may be made of a material having high reflectivity. In particular, the lower grid patterns WGP1 may be made of the same material (i.e., the first material) as the lower reflective pattern RPT1. A first height H1' from the surface SUB1a of the first base substrate SUB1 to an upper surface of the upper reflective pattern RPT2 may be greater than a second height H2' from the surface SUB1a of the first base substrate SUB1 to upper surfaces of the lower grid patterns WGP1. Further, a height from the surface SUB1a of the first base substrate SUB1 to an upper surface of the lower reflective pattern RPT1 may be smaller than the first height H1' from the surface SUB1a of the first base substrate SUB1 to the upper surface of the upper reflective pattern RPT2.

Second residual mask grid patterns MGP2 may be located on the lower grid patterns WGP1. In particular, the second residual mask grid patterns MGP2 may be located directly on the lower grid patterns WGP1. Like the first residual mask grid patterns MGP1, the second residual mask grid patterns MGP2 may be residual patterns of the hard mask layer formed in a manufacturing process. The second residual mask grid patterns MGP2 may include the same material as the first residual mask grid patterns MGP1.

An align key ALK may overlap a first align key area KAI and include a lower align key pattern APT1 located on the surface SUB1a of the first base substrate SUB1 and an upper align key pattern APT2 located on the lower align key pattern APT1.

The lower align key pattern APT1 may be made of a material having high reflectivity. In particular, the lower align key pattern APT1 may be made of the same material (i.e., the first material) as the lower reflective pattern RPT1 and the lower grid patterns WGP1. A height from the surface SUB1a of the first base substrate SUB1 to an upper surface of the lower align key pattern APT1 may be equal to the second height H2'. That is, the height of the lower align key pattern APT1, the height of the lower reflective pattern RPT1, and the height of the lower grid patterns WGP1 may be equal.

The upper align key pattern APT2 may be located on the lower align key pattern APT1. The upper align key pattern APT2 may be made of the same material (i.e., the second material) as the upper reflective pattern RPT2.

A third height H3 from the surface SUB1a of the first base substrate SUB1 to an upper surface of the upper align key pattern APT2 may be greater than the second height H2'. In other words, the upper surfaces of the lower grid patterns WGP1 may be located lower than the upper surface of the upper align key pattern APT2. In addition, the third height H3 may be equal to the first height H1'. That is, the height from the surface SUB1a of the first base substrate SUB1 to the upper surface of the upper align key pattern APT2 may be equal to the height from the surface SUB1a of the first base substrate SUB1 to the upper surface of the upper reflective pattern RPT2.

A residual mask pattern MPT may be located on the upper align key pattern APT2, and part of the residual mask pattern MPT may extend to a surrounding area SA. Like the first residual mask grid patterns MGP1 and the second residual mask grid patterns MGP2, the residual mask pattern MPT may be a residual pattern of the hard mask layer formed in the manufacturing process. The residual mask pattern MPT may include the same material as the first residual mask grid patterns MGP1 and the second residual mask grid patterns MGP2.

Figure 8:
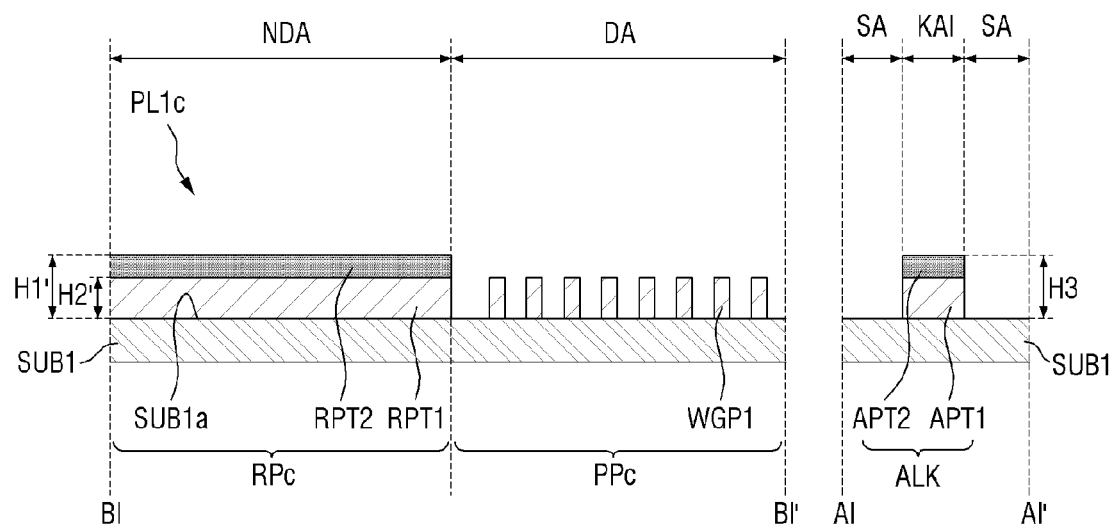
FIG. 8 is a cross-sectional view of a modified exemplary embodiment of a first polarizing member and an align key illustrated in FIG. 7.

FIG. 8 is a cross-sectional view of a modified embodiment of the first polarizing member PL1b and the align key ALK illustrated in FIG. 7.

Referring to FIGS. 7 and 8, a first polarizing member PL1c according to the current embodiment includes a reflective part RPc and a polarizing part PPc. The first polarizing member PL1c according to the current embodiment may be different from the first polarizing member PL1b of FIG. 7 in that first residual mask grid patterns MGP1 are not located on an upper reflective pattern RPT2 of the reflective part RPc, that second residual mask grid patterns MGP2 are not located on lower grid patterns WGP1 of the polarizing part PPc, and that a residual mask pattern MPT is not additionally located on an align key ALK. Other elements may be substantially identical to those described above with reference to FIG. 7, and thus a detailed description thereof is omitted.

FIGS. 9 through 23 are cross-sectional views illustrating an example method of manufacturing the first polarizing member PL1 and the align key ALK of FIG. 5.

Figure 9:
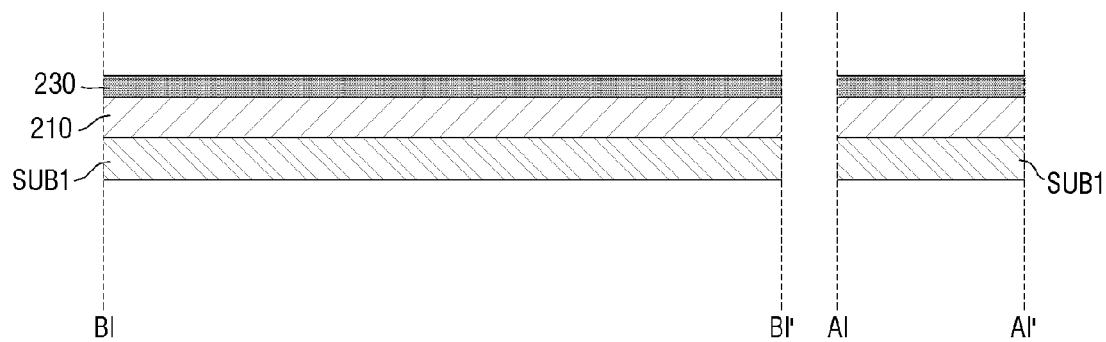
FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23 are cross-sectional views illustrating an exemplary embodiment of a method of manufacturing the first polarizing member and the align key of FIG. 5.

Referring to FIGS. 9 through 23, a first material layer 210 including the first material is formed on the whole surface of a first base substrate SUB1, and a second material layer 230 including the second material is formed on the first material layer 210 as illustrated in FIG. 9. In an exemplary embodiment, the first material may be aluminum, and the second material may be titanium, molybdenum or an alloy thereof.

Figure 10:
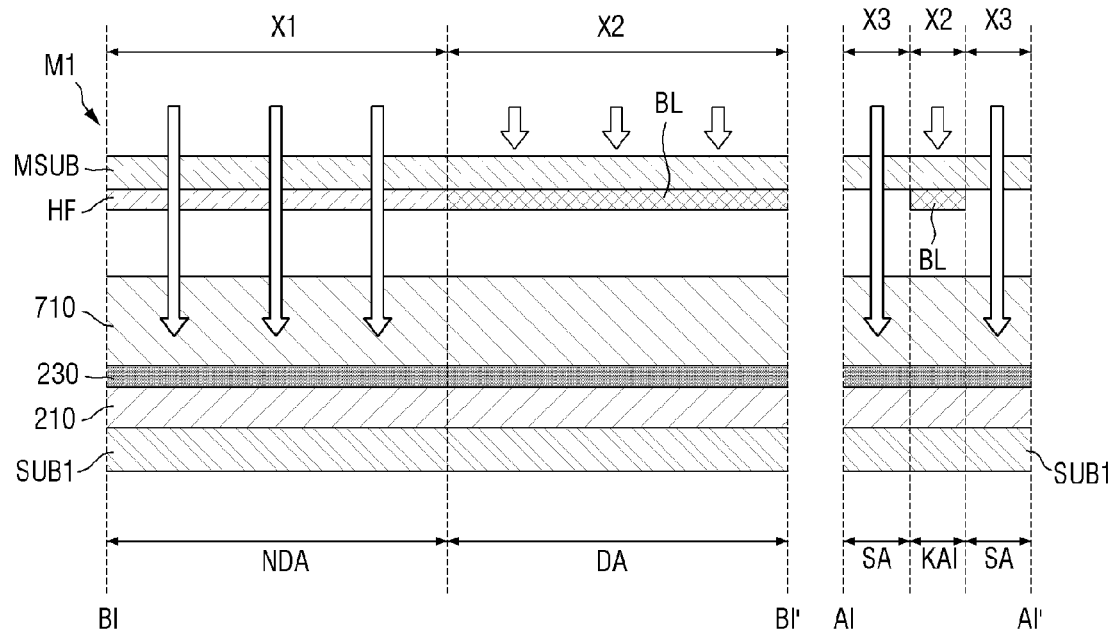

Referring to FIG. 10, a photoresist layer 710 is formed on the second material io layer 230. A case where the photoresist layer 710 is a positive photoresist will hereinafter be described as an example, but the photoresist layer 710 is not limited to the positive photoresist.

A mask M1 may be aligned on the photoresist layer 710. The mask M1 may be a multi-tone mask. In an example, the mask M1 may be a halftone mask including a mask substrate MSUB, a halftone part HF, and a light-blocking part BL.

The mask M1 may include a first area X1, a second area X2, and a third area X3. The first area X1 may correspond to a non-display area NDA of the first base substrate SUB1, the second area X2 may correspond to a display area DA and a first align key area KAI of the first base substrate SUB1, and the third area X3 may correspond to a surrounding area SA of the first base substrate SUB1.

The halftone part HF may be placed on the mask substrate MS to correspond to the first area X1, and the light-blocking part BL may be placed on the mask substrate MS to correspond to the second area X2. The halftone part HF or the light-blocking part BL may not be placed in the third area X3. Accordingly, light transmittance of the first area X1 may be smaller than that of the third area X3, and light may not transmit through the second area X2.

Next, the photoresist layer 710 may be exposed to light using the mask M1. More specifically, when light is irradiated to an upper surface of the mask M1, most of light incident on the third area X3 passes through the mask Ml. Therefore, the photoresist layer 710 in the surrounding area SA may be fully exposed. In addition, since the intensity of light incident on the first area X1 may be reduced by the halftone part HF, the photoresist layer 710 in the non-display area NDA may be under-exposed. Further, light incident on the second area X2 may be blocked by the light-blocking part BL. Therefore, the photoresist layer 710 in the display area DA and the first align key area KAI may be not exposed. Here, when the photoresist layer 710 is "fully exposed," it may be exposed to light with energy exceeding an optimal exposure energy that fully exposes photoresist in a thickness direction. When the photoresist layer 710 is "under-exposed," it may be exposed to light with energy lower than the optimal exposure energy.

Figure 11:
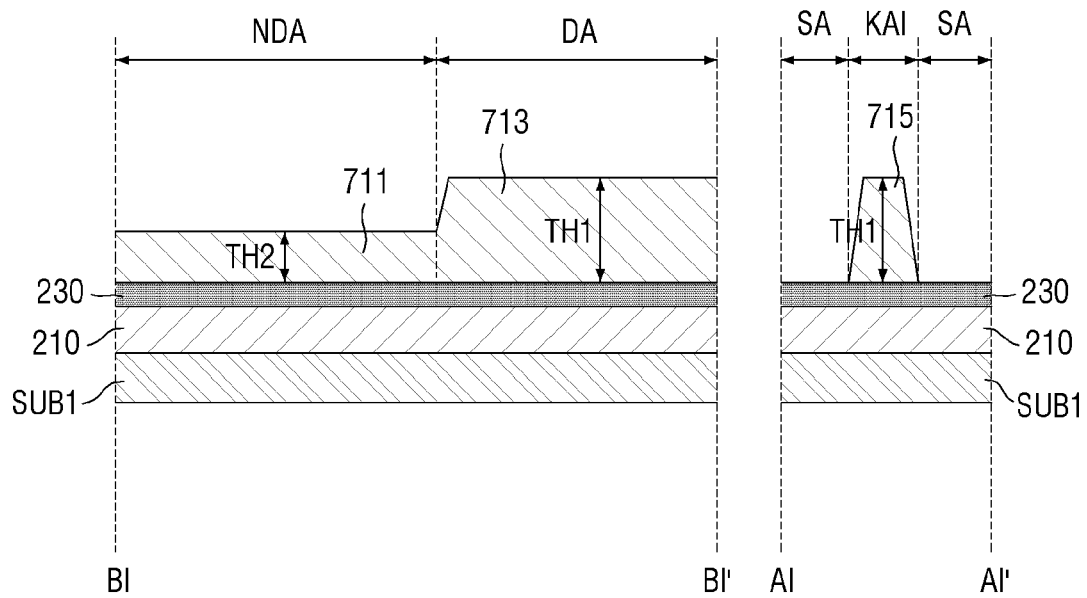

Next, the photoresist layer 710 may be developed, thereby forming a first photoresist pattern 711 in a portion corresponding to the non-display area NDA, a second photoresist pattern 713 in a portion corresponding to the display area DA, and a third photoresist pattern 715 in an area corresponding to the first align key area KAI as illustrated in FIG. 11. In addition, no photoresist pattern may be formed in an area corresponding to the surrounding area SA. As a result, an upper surface of the second material layer 230 located in the surrounding area SA may be exposed without being covered by a photoresist pattern.

As described above, the first photoresist pattern 711 may be formed by under-exposing the photoresist layer 710, and the second photoresist pattern 713 and the third photoresist pattern 715 are formed by not exposing the photoresist layer 710. Therefore, a thickness TH1 of each of the second photoresist pattern 713 and the third photoresist pattern 715 may be greater than a thickness TH2 of the first photoresist pattern 711.

Figure 12:
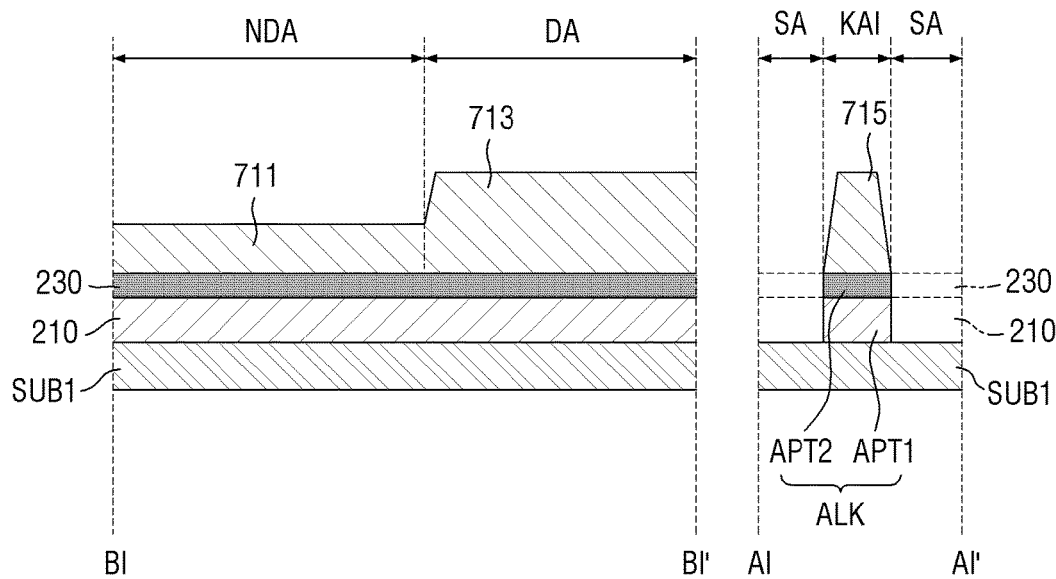

Referring to FIG. 12, the second material layer 230 and the first material layer 210 are etched sequentially using the first photoresist pattern 711, the second photoresist pattern 713 and the third photoresist pattern 715 as an etch mask. Accordingly, the second material layer 230 and the first material layer 210 located in the surrounding area SA are removed, and an align key ALK may be formed in the first align key area KAI. More specifically, a lower align key pattern APT1 formed by etching the first material layer 210 and an upper align key pattern APT2 formed by etching the second material layer 230 are disposed in the first align key area KAI.

Figure 13:
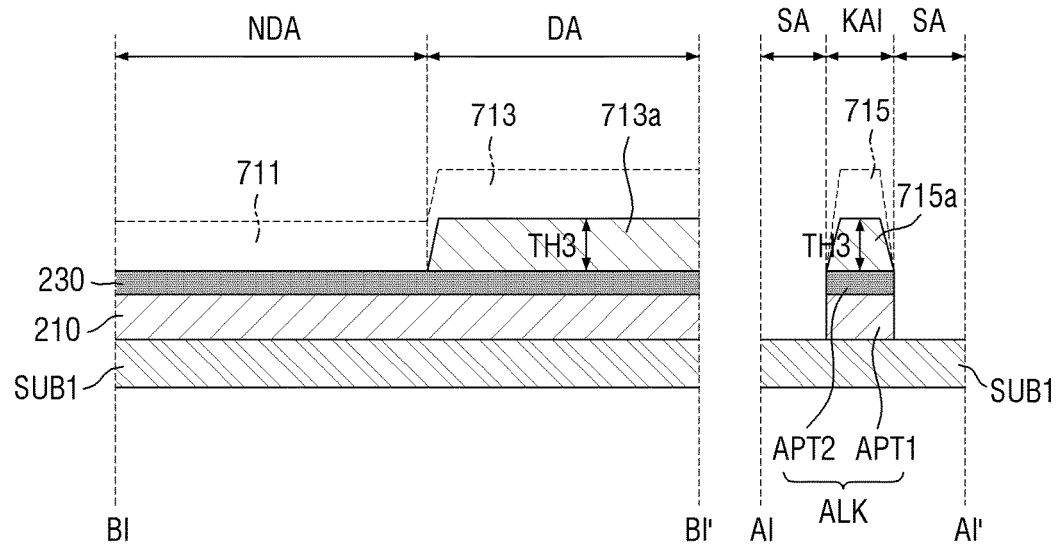

Referring to FIG. 13, the first photoresist pattern 711 may be removed using, e.g., an ashing process, thereby exposing a portion of the second material layer 230 which corresponds to the non-display area NDA. The second photoresist pattern 713 and the third photoresist pattern 715 may also be partially removed in the process of removing the first photoresist pattern 711. As described above, the thickness TH1 of each of the second photoresist is pattern 713 and the third photoresist pattern 715 may be greater than the thickness TH2 of the first photoresist pattern 711. Therefore, the thickness TH1 of each of the second photoresist pattern 713 and the third photoresist pattern 715 may be reduced in the process of removing the first photoresist pattern 711. This may result in the formation of a second sub-photoresist pattern 713a and a third sub-photoresist pattern 715a having a smaller thickness TH3 than that of each of the second photoresist pattern 713 and the third photoresist pattern 715.

The second material layer 230 and the first material layer 210 are etched sequentially using the second photoresist pattern 713 and the third photoresist pattern 715 as an etch mask. Accordingly, a portion of the second material layer 230 and a portion of the first material layer 210 which correspond to the surrounding area SA are removed, and the align key ALK may be formed in the first align key area KAI. More specifically, the lower align key pattern APT1 formed by etching the first material layer 210 and the upper align key pattern APT2 formed by etching the second material layer 230 are disposed in the first align key area KAI.

Figure 14:
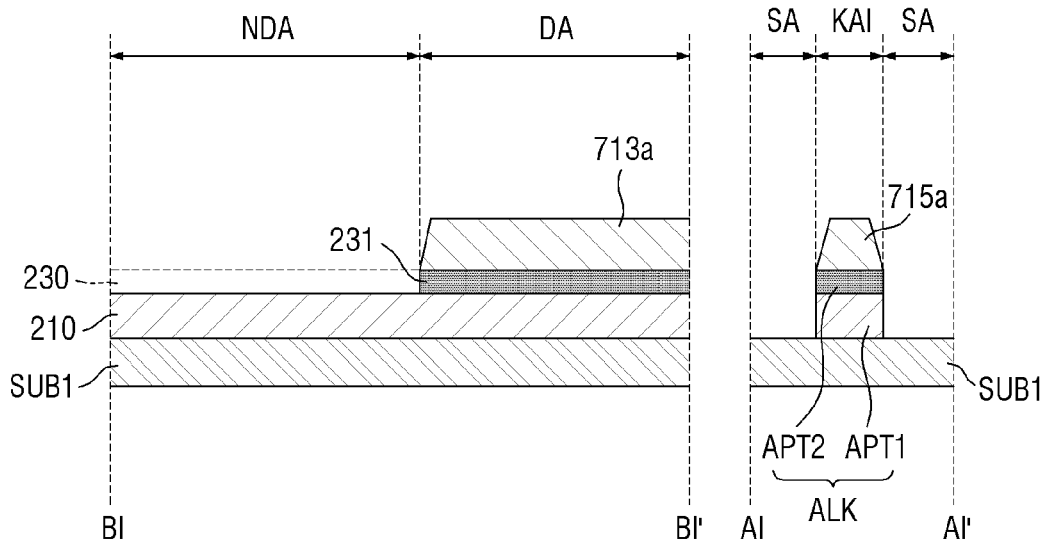

Referring to FIG. 14, the second material layer 230 may be etched using the second sub-photoresist pattern 713a and the third sub-photoresist pattern 715a as an etch mask. Accordingly, a portion of the second material layer 230 which corresponds to the non-display area NDA may be removed, and a step pattern 231 may be formed between the second sub-photoresist pattern 713a and the first material layer 210. As described above, the second material included in the second material layer 230 and the first material included in the first material layer 210 may have different etch rates. Accordingly, a portion of the first material layer 210 which corresponds to the non-display area NDA may not be etched in the process of removing the second material layer 230.

Figure 15:
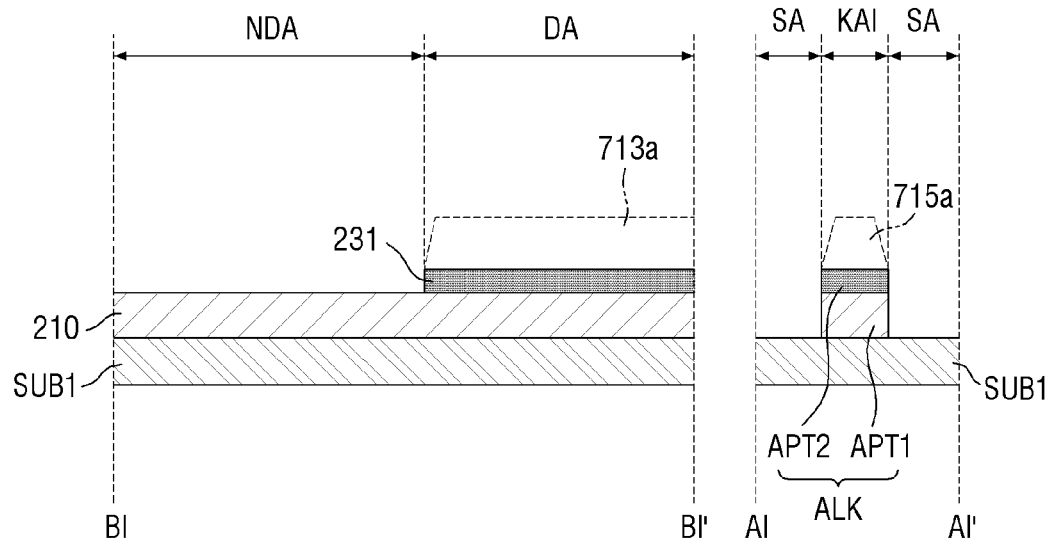
Figure 16:
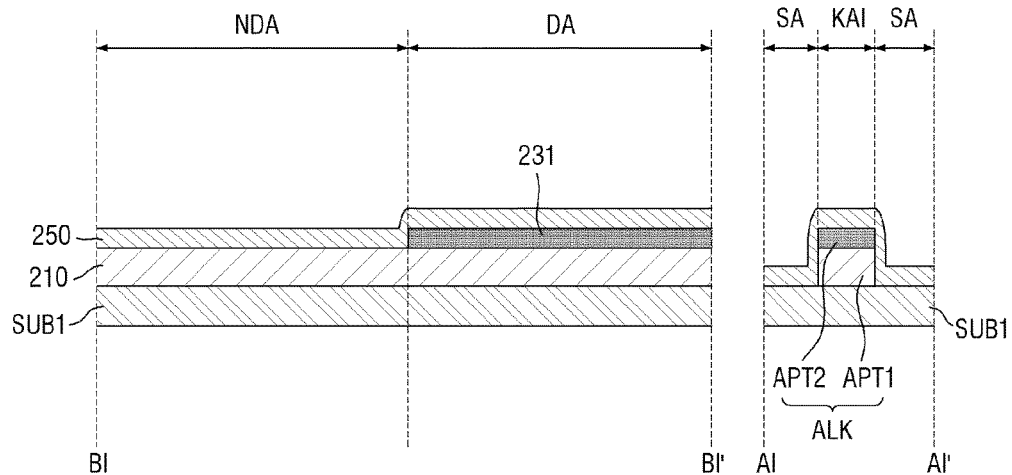

Referring to FIG. 15, the second sub-photoresist pattern 713a and the third sub-photoresist pattern 715a are removed. Referring to FIG. 16, a hard mask layer 250 may be formed on the whole surface of the first base substrate SUB1 to cover the first material layer 210, the step pattern 231, and the align key ALK. The hard mask layer 250 may include an inorganic insulating material such as silicon nitride or silicon oxide.

Figure 17:
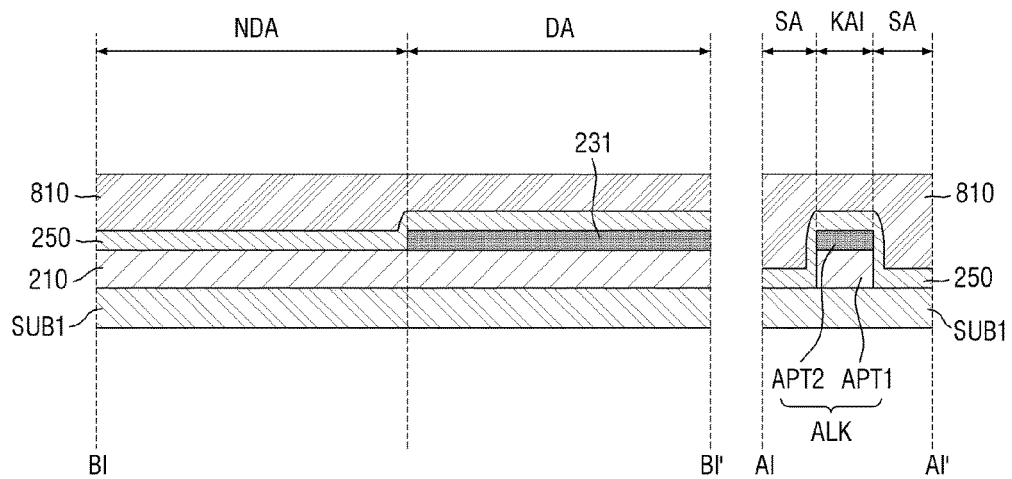

Referring to FIG. 17, a resin layer 810 may be formed on the whole surface of the first base substrate SUB1 to cover the hard mask layer 250. As described above, the step pattern 231 may be located in the portion corresponding to the display area DA. Accordingly, a portion of the resin layer 810 which corresponds to the non-display area NDA may be thicker than a portion of the resin layer 810 which corresponds to the display area DA.

Figure 18:
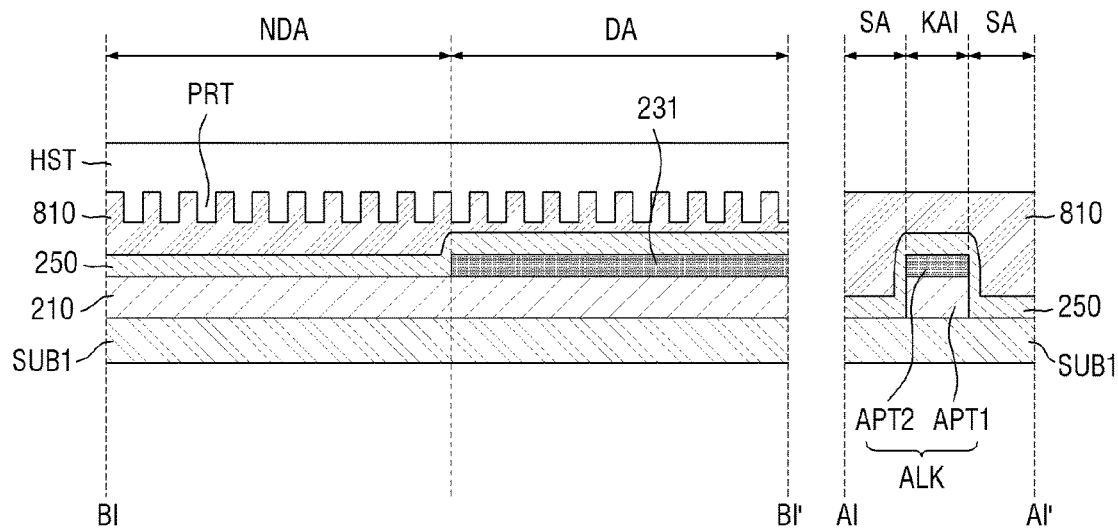

Referring to FIG. 18, a hard stamp HST having protruding and recessed patterns PRT may be pressed against an upper surface of the resin layer 810 to transfer inverted patterns of the protruding and recessed patterns PRT onto the resin layer 810. Here, the hard stamp HST may be rigid and hardly bends in the pattern transfer process.

Figure 19:
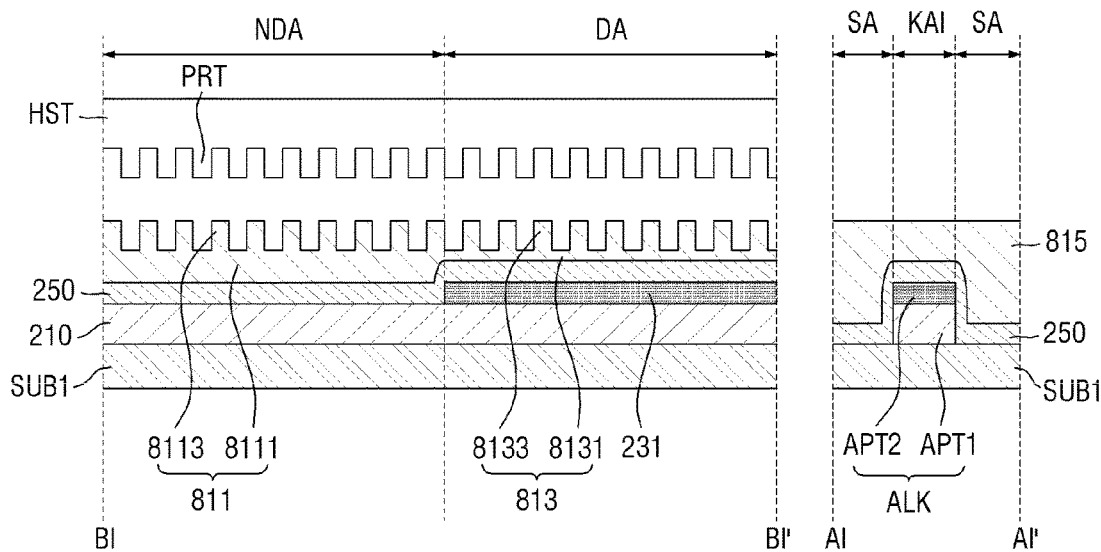

Referring to FIG. 19, the hard stamp HST may be separated from the resin layer 810, and then the resin layer 810 may be cured to form a first resin pattern 811, a second resin pattern 813, and a third resin pattern 815. The first resin pattern 811 may include a first bottom part 8111 located on the hard mask layer 250 and a plurality of first patterns 8113 located on the first bottom part 8111, and the second resin pattern 813 may include a second bottom part 8131 located on the hard mask layer 250 and a plurality of second patterns 8133 located on the second bottom part 8131.

Since the step pattern 231 is located in the portion corresponding to the display area DA, the thickness of the portion of the resin layer 810 which corresponds to the non-display area NDA may be different from that of the portion of the resin layer 810 which corresponds to the display are DA. Since the hard stamp HST is rigid as described above, it hardly bends in the pattern transfer process. Accordingly, the first bottom part 8111 may be relatively thicker than the second bottom part 8131.

Figure 20:
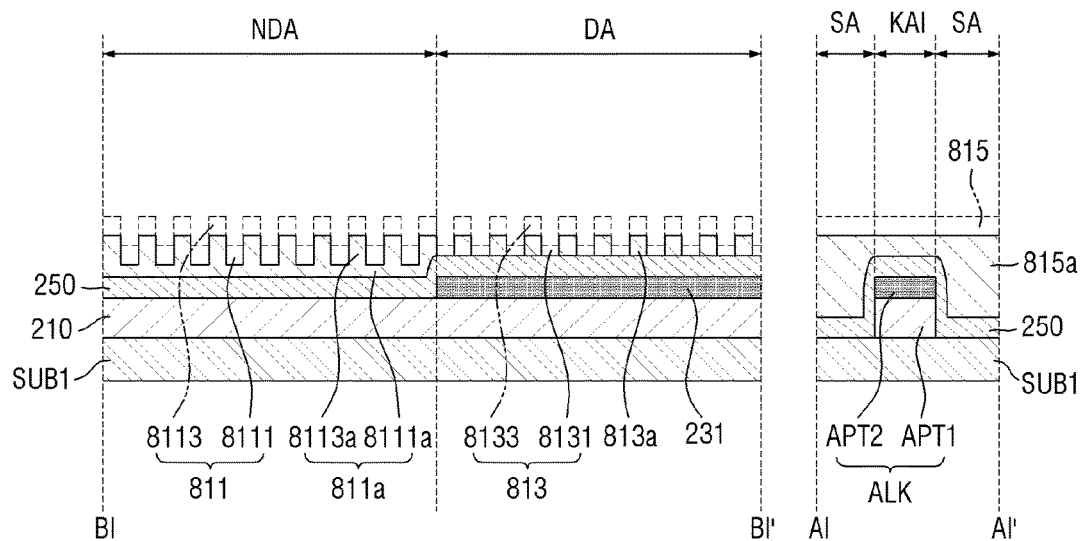

Referring to FIG. 20, the second bottom part 8131 of the second resin pattern 813 may be removed using an ashing process or a dry-etching process. The thickness of each of the second patterns 8133 may be reduced in the process of removing the second bottom part 8131. As a result, second sub-resin patterns 813a may be formed. The removal of the second bottom part 8131 may partially expose a portion of the hard mask layer 250 which corresponds to the display area DA, more specifically, may expose the hard mask layer 250 between the second sub-resin patterns 813a. The first resin pattern 811 and the third resin pattern 815 may also be partially removed in the process of removing the second bottom part 8131. As described above, the first bottom part 8111 of the first resin pattern 811 may be thicker than the second bottom part 8131 of the second resin pattern 813. Therefore, even if the second bottom part 8131 is removed, part of the first bottom part 8111 may remain. Accordingly, a first sub-resin pattern 811a formed by partially removing the first resin pattern 811 may be disposed in the portion corresponding to the non-display area NDA. The first sub-resin pattern 811a may include a first sub-bottom part 8111a and a plurality of first sub-patterns 8113a. In addition, a third sub-resin pattern 815a formed by partially removing the third resin pattern 815 may be disposed in the portion corresponding to the first align key area KAI and the surrounding area SA.

Figure 21:
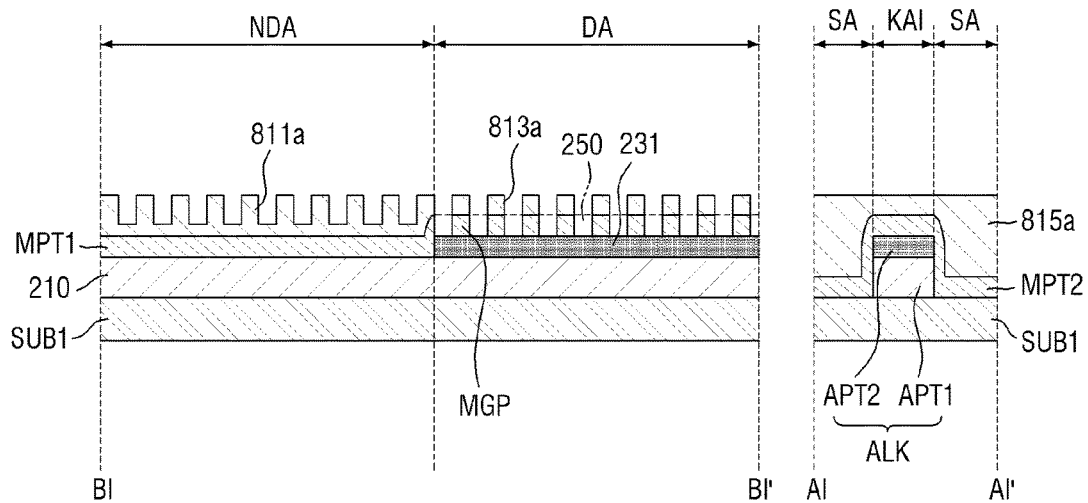

Referring to FIG. 21, the hard mask layer 250 may be etched using the first sub-resin pattern 811a, the second sub-resin patterns 813a, and the third sub-resin pattern 815a as an etch mask. In an exemplary embodiment, the hard mask layer 250 may be etched by dry etching. Accordingly, portions of the hard mask layer 250 which are not covered by the second sub-resin patterns 813a may be removed, resulting in the formation of residual mask grid patterns MGP in the portion corresponding to the display area DA, a first residual mask pattern MPT1 in the portion corresponding to the non-display area NDA, and a second residual mask pattern MPT2 on the align key ALK.

Figure 22:
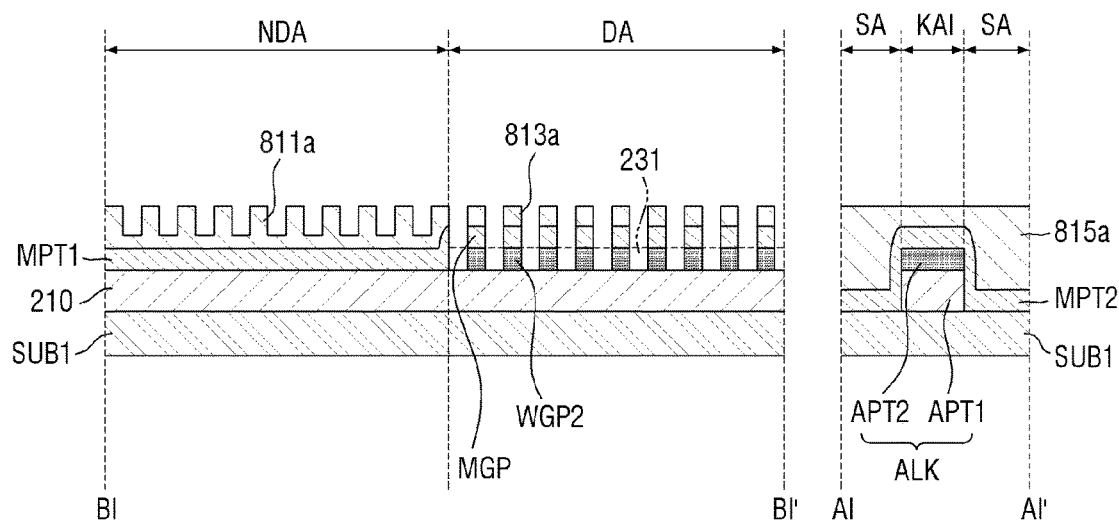

Referring to FIG. 22, the step pattern 231 may be etched using the first sub-resin pattern 811a, the second sub-resin patterns 813a, the third sub-resin pattern 815a, the residual mask grid patterns MGP, the first residual mask pattern MPT1 and the second residual mask pattern MPT2 as an etch mask. Accordingly, portions of the step pattern 231 which are not covered by the second sub-resin patterns 813a or the residual mask grid patterns MGP may be removed, resulting in the formation of upper grid patterns WGP2 in the portion corresponding to the display area DA.

Figure 23:
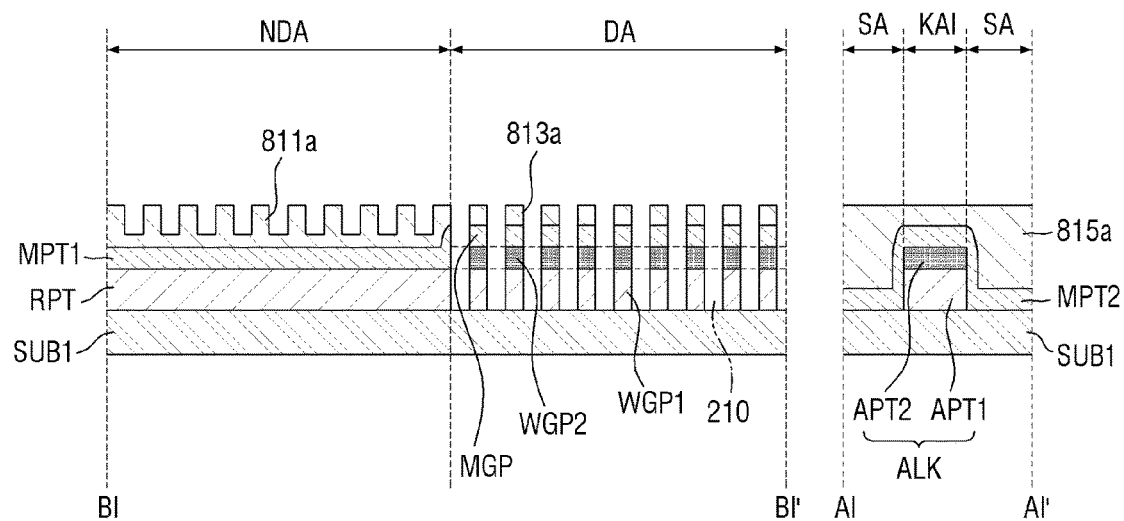

Referring to FIG. 23, the first material layer 210 may be etched using the first sub-resin pattern 811a, the second sub-resin patterns 813a, the third sub-resin pattern 815a, the residual mask grid patterns MGP, the first residual mask pattern MPT1, and the second residual mask pattern MPT2 as an etch mask. Accordingly, portions of the first material layer 210 which are not covered by the second sub-resin patterns 813a, the residual mask grid patterns MGP or the upper grid patterns WGP2 may be removed. As a result, lower grid patterns WGP1 formed by etching the first material layer 210 may be disposed in the portion corresponding to the display area DA, and a lower reflective pattern RPT formed by etching the first material layer 210 may be formed in the portion corresponding to the non-display area NDA.

Next, the first polarizing member PL1 and the align key ALK illustrated in FIG. 5 may be formed by removing the first sub-resin pattern 811a, the second sub-resin patterns 813a, and the third sub-resin pattern 815a. In addition, the first polarizing member PL1a and the align key ALK illustrated in FIG. 6 may be formed by removing the first sub-resin pattern 811a, the second sub-resin patterns 813a and the third sub-resin pattern 815a and further removing the residual mask grid patterns MGP, the first residual mask pattern MPT1 and the second residual mask pattern MPT2.

FIGS. 24 through 29 are cross-sectional views illustrating an example method of manufacturing the first polarizing member PL1a and the align key ALK of FIG. 6. For simplicity, a description of elements substantially identical to those described above will be given briefly or omitted.

Figure 24:
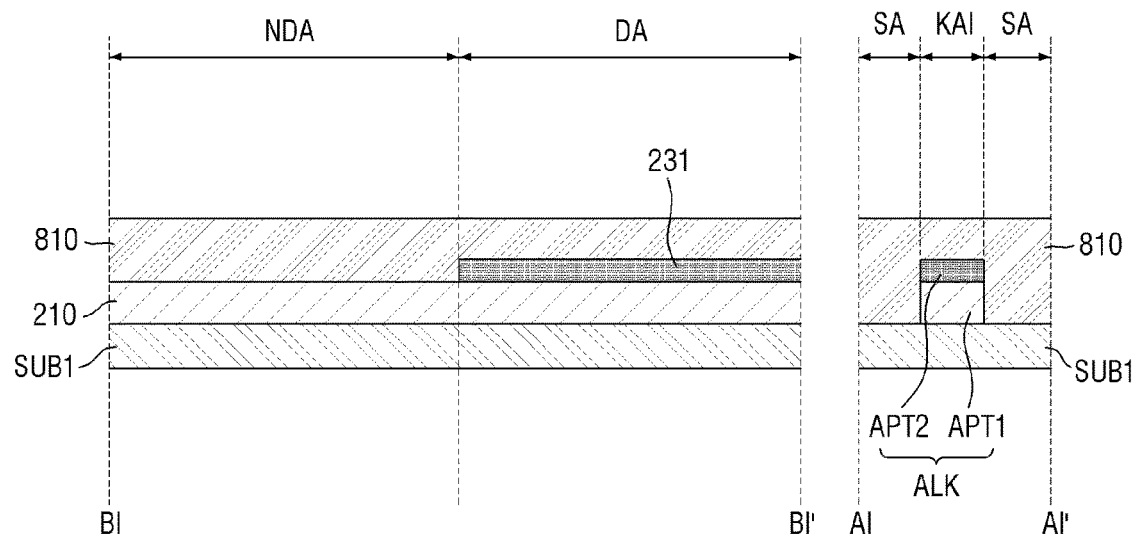
FIG. 24, FIG. 25, FIG. 26, FIG. 27, FIG. 28, and FIG. 29 are cross-sectional views illustrating an exemplary embodiment of a method of manufacturing the first polarizing member and the align key of FIG. 6.

Referring to FIG. 24, a first material layer 210 may be formed on the whole surface of a first base substrate SUB1, a step pattern 231 may be formed on the first material layer 210 which corresponds to a display area DA, and an align key ALK may be formed on the first base substrate SUB1 which corresponds to a first align key area KAI. The process of manufacturing the above elements may be the same as the process described above with reference to FIGS. 9 through 15, and thus a description thereof will be omitted.

Next, a resin layer 810 may be formed on the whole surface of the first base substrate SUB1 to cover the first material layer 210, the step pattern 231, and the align key ALK. Due to the step pattern 231, a portion of the resin layer 810 which corresponds to the non-display area NDA may be greater than that of a portion of the resin layer 810 which corresponds to the display area DA.

Figure 25:
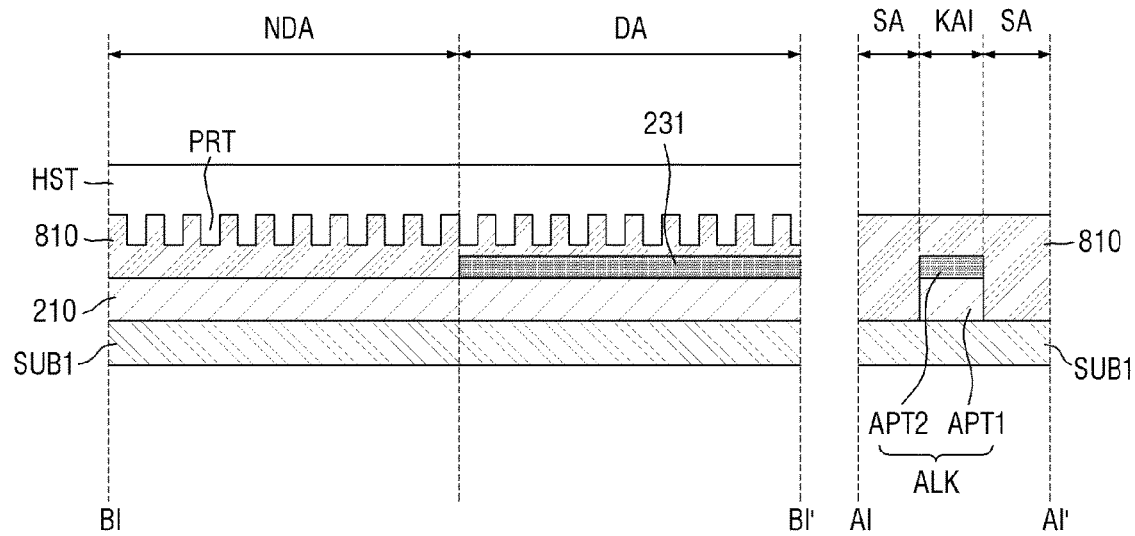

Referring to FIG. 25, a hard stamp HST having protruding and recessed patterns PRT may be pressed against an upper surface of the resin layer 810 to transfer inverted patterns of the protruding and recessed patterns PRT onto the resin layer 810.

Figure 26:
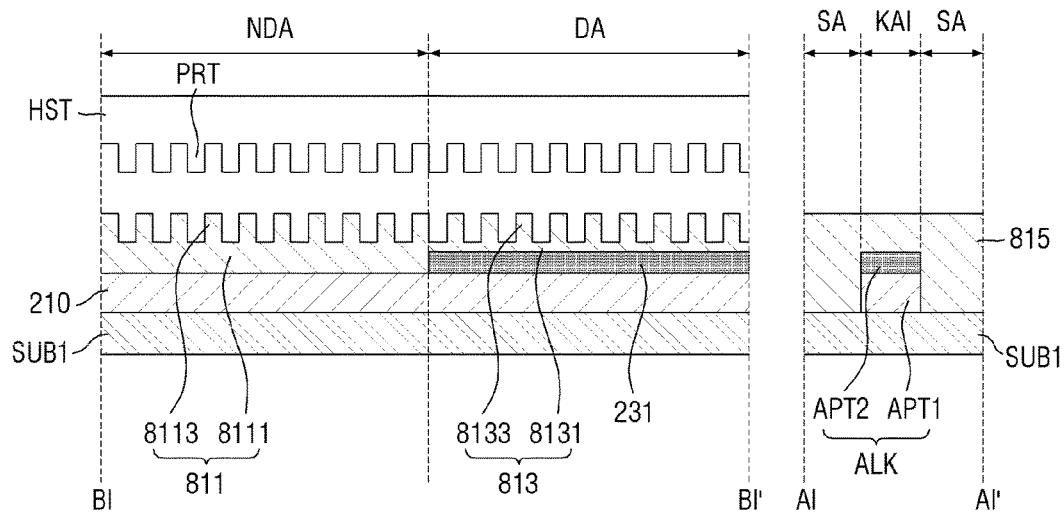

Referring to FIG. 26, the hard stamp HST may be separated from the resin layer 810, and then the resin layer 810 may be cured to form a first resin pattern 811, a second resin pattern 813, and a third resin pattern 815. The first resin pattern 811 may include a first bottom part 8111 located on the first material layer 210 and a plurality of first patterns 8113 located on the first bottom part 8111, and the second resin pattern 813 may include a second bottom part 8131 located on the step pattern 231 and a plurality of second patterns 8133 located on the second bottom part 8131.

Figure 27:
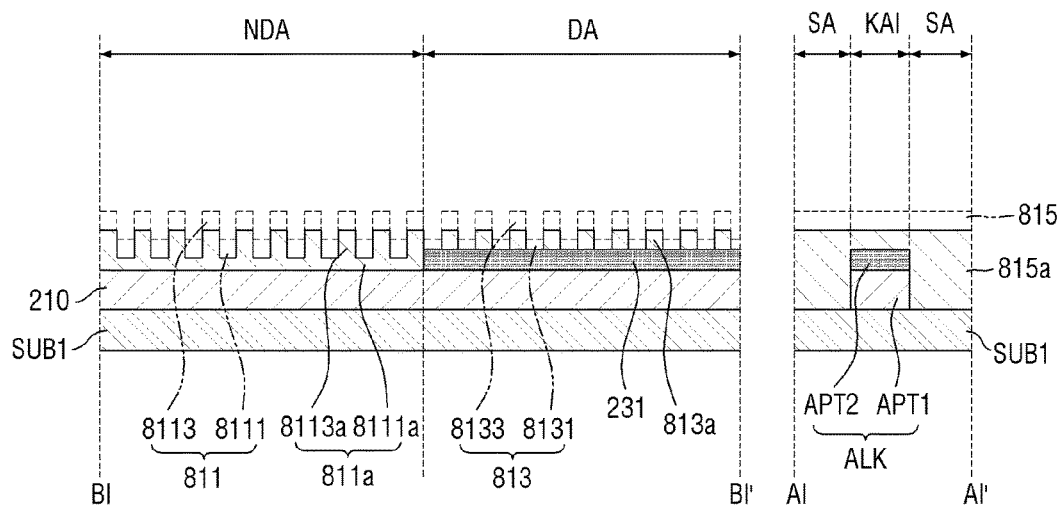

Referring to FIG. 27, the second bottom part 8131 of the second resin pattern 813 may be removed using an ashing process or a dry-etching process. As a result, the step pattern 231 may be partially exposed. In the process of removing the second bottom part 8131, the second patterns 8133 may be partially removed to form second sub-resin patterns 813a, and the first resin pattern 811 may be partially removed to form a first sub-resin pattern 811a and a third sub-resin pattern 815a. The first sub-resin pattern 811a may include a first sub-bottom part 8111a and a plurality of first sub-patterns 8113a as described above.

Figure 28:
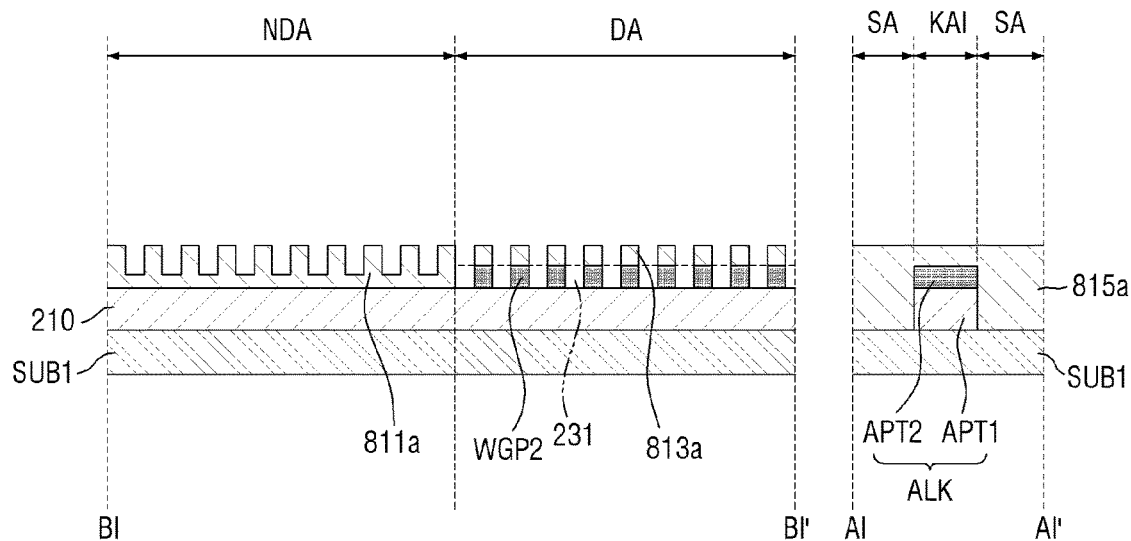

Referring to FIG. 28, the step pattern 231 may be etched using the first sub-resin pattern 811a, the second sub-resin patterns 813a and the third sub-resin pattern 815a as an etch mask. Accordingly, portions of the step pattern 231 which are not covered by the second sub-resin patterns 813a may be removed, and upper grid patterns WGP2 may be formed in a portion corresponding to the display area DA.

Figure 29:
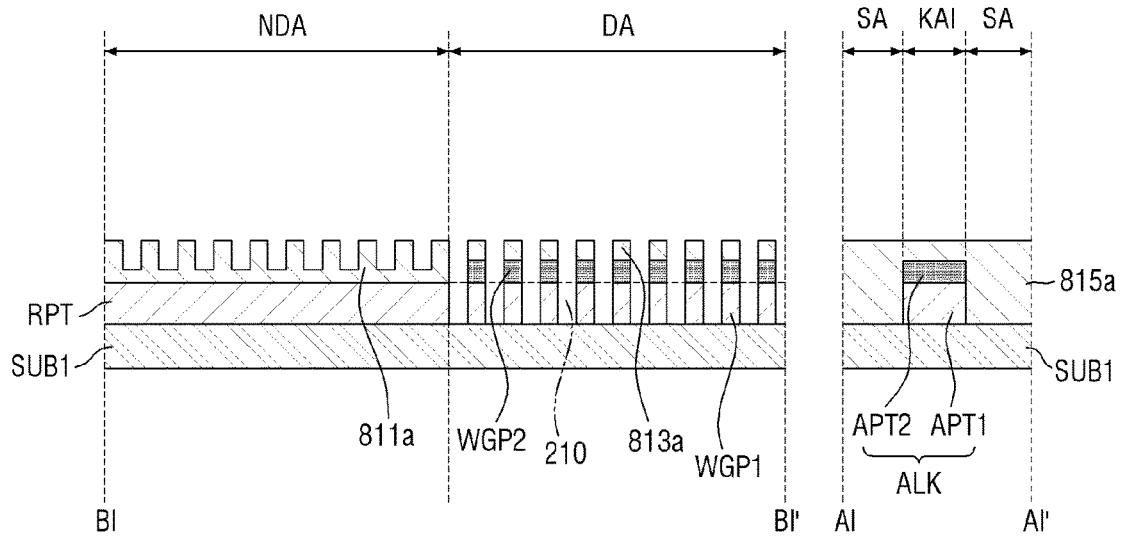

Referring to FIG. 29, the first material layer 210 may be etched using the first sub-resin pattern 811a, the second sub-resin patterns 813a and the third sub-resin pattern 815a as an etch mask. Accordingly, portions of the first material layer 210 which are not covered by the second sub-resin patterns 813a or the upper grid patterns WGP2 may be removed. In addition, lower grid patterns WGP1 formed by etching the first material layer 210 may be disposed in the portion corresponding to the display area DA, and a lower reflective pattern RPT formed by etching the first material layer 210 may be formed in a portion corresponding to the non-display area NDA.

Next, the first sub-resin pattern 811a, the second sub-resin patterns 813a, and the third sub-resin pattern 815a may be removed, thereby forming the first polarizing member PL1a and the align key ALK illustrated in FIG. 6.

FIGS. 30 through 43 are cross-sectional views illustrating an example method of manufacturing the first polarizing member PL1b and the align key ALK of FIG. 7. For simplicity, a description of elements substantially identical to those described above will be given briefly or omitted.

Figure 30:
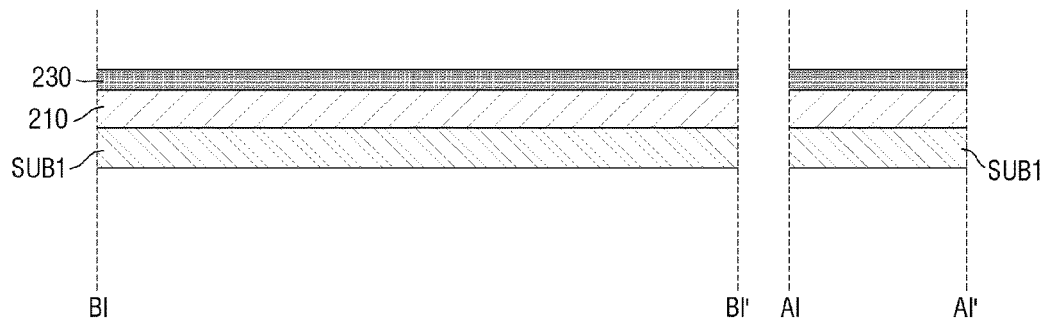
FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, and FIG. 43 are cross-sectional views illustrating an exemplary embodiment of a method of manufacturing the first polarizing member and the align key of FIG. 7.

Referring to FIGS. 30 through 43, a first material layer 210 including the first material may be formed on the whole surface of a first base substrate SUB1, and a second material layer 230 including the second material may be formed on the first material layer 210 as illustrated in FIG. 30.

Figure 31:
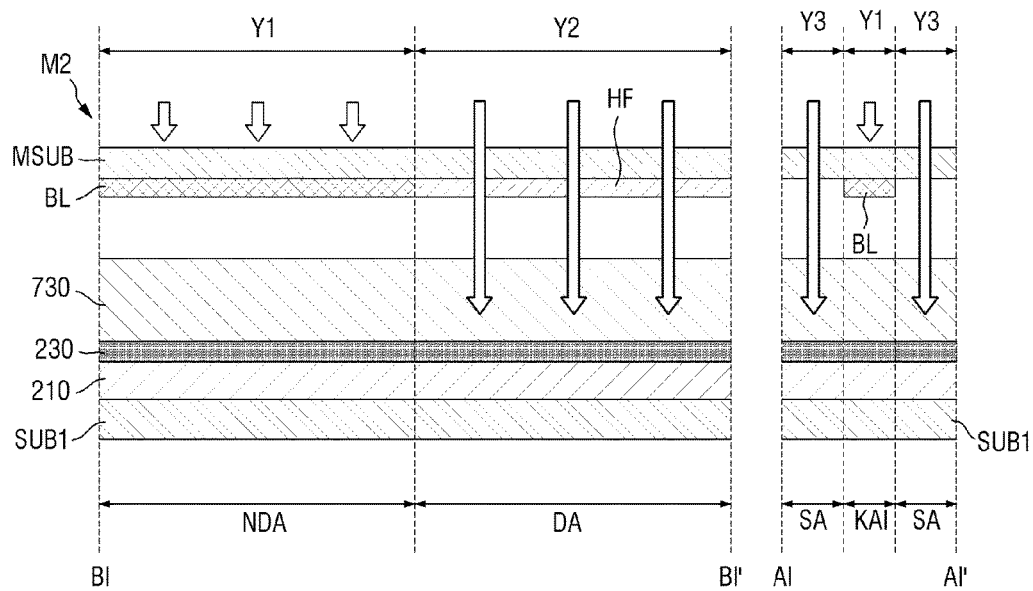

Referring to FIG. 31, a photoresist layer 730 may be formed on the second material layer 230. The photoresist layer 730 may be positive photoresist. However, the photoresist layer 730 is not limited to the positive photoresist as described above.

A mask M2 may be aligned on the photoresist layer 730. The mask M2 may be a multi-tone mask. In an example, the mask M2 may be a halftone mask including a mask substrate MSUB, a halftone part HF, and a light-blocking part BL.

The mask M2 may include a first area Y1, a second area Y2, and a third area Y3. The first area Y1 may correspond to a non-display area NDA of the first base substrate SUB1, the second area Y2 may correspond to a display area DA and a first align key area KAI of the first base substrate SUB1, and the third area Y3 may correspond to a surrounding area SA of the first base substrate SUB1.

The halftone part HF may be placed on the mask substrate MS to correspond to the second area Y2, and the light-blocking part BL may be placed on the mask substrate MS to correspond to the first area Y1. The halftone part HF or the light-blocking part BL may not be placed in the third area Y3.

Next, the photoresist layer 730 may be exposed to light using the mask M2. More specifically, when light is irradiated to an upper surface of the mask M2, most of light incident on the third area Y3 passes through the mask M2. Therefore, the photoresist layer 730 in the surrounding area SA may be fully exposed. In addition, since the intensity of light incident on the second area Y2 may be reduced by the halftone part HF, the photoresist layer 730 in the display area DA may be under-exposed. Further, light incident on the first area Y1 may be blocked by the light-blocking part BL. Therefore, the photoresist layer 730 in the non-display area NDA and the first align key area KAI may be not exposed.

Figure 32:
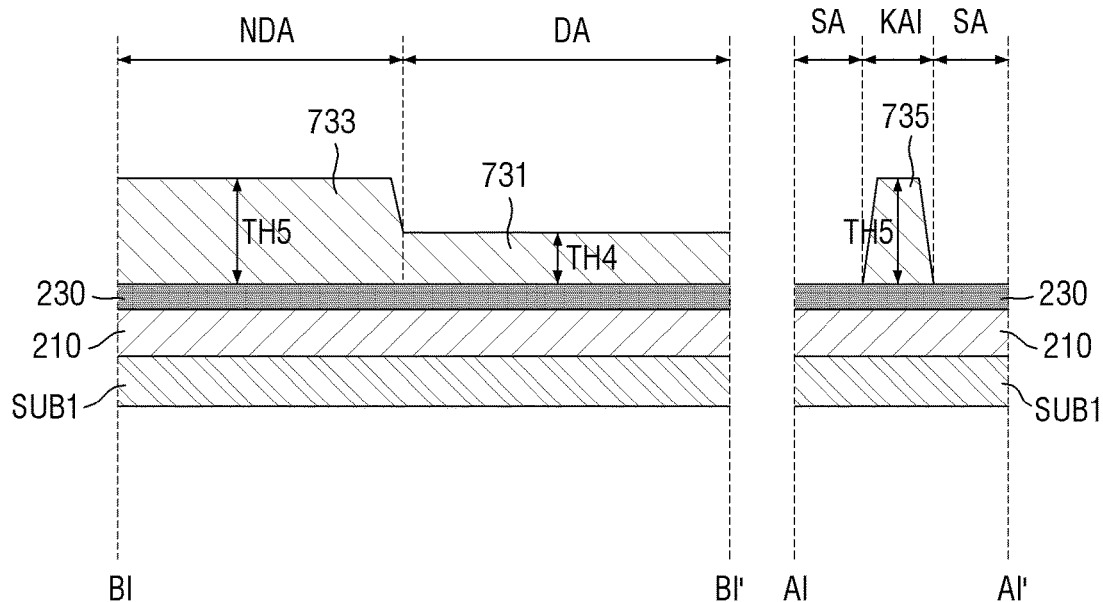

Next, the photoresist layer 730 may be developed, thereby forming a first photoresist pattern 731 in a portion corresponding to the display area DA, a second photoresist pattern 733 in a portion corresponding to the non-display area NDA, and a third photoresist pattern 735 in an area corresponding to the first align key area KAI as illustrated in FIG. 32. In addition, no photoresist pattern may be formed in an area corresponding to the surrounding area SA. As described above, the first photoresist pattern 731 may be formed by under-exposing the photoresist layer 730, and the second photoresist pattern 733 and the third photoresist pattern 735 are formed by not exposing the photoresist layer 730. Therefore, a thickness TH4 of each of the second photoresist pattern 733 and the third photoresist pattern 735 may be greater than a thickness TH5 of the first photoresist pattern 731.

Figure 33:
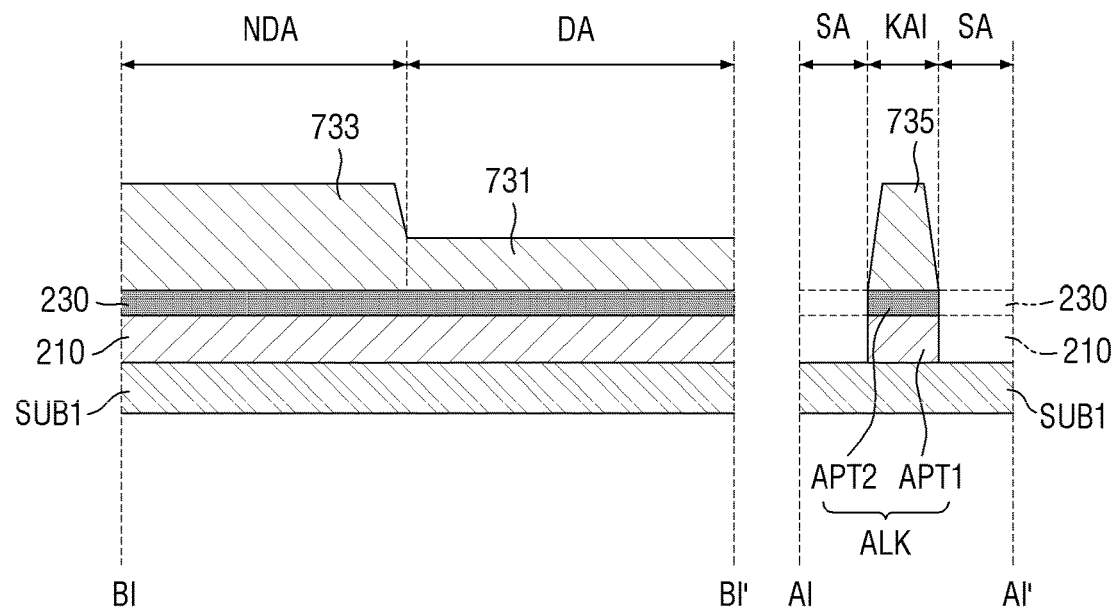

Referring to FIG. 33, the second material layer 230 and the first material layer 210 are etched sequentially using the first photoresist pattern 731, the second photoresist pattern 733 and the third photoresist pattern 735 as an etch mask. Accordingly, the second material layer 230 and the first material layer 210 located in the surrounding area SA are removed, and an align key ALK including a lower align key pattern APT1 and an upper align key pattern APT2 may be formed in the first align key area KAI.

Figure 34:
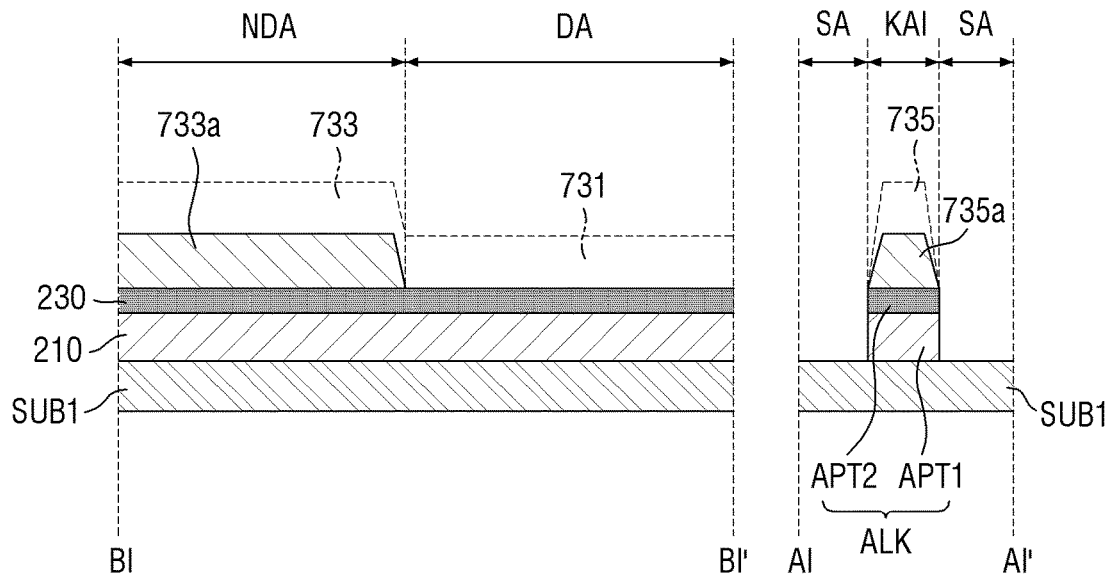

Referring to FIG. 34, the first photoresist pattern 731 may be removed using, e.g., an ashing process, thereby exposing a portion of the second material layer 230 which corresponds to the display area DA. The thickness TH5 of each of the second photoresist pattern 733 and the third photoresist pattern 735 may be reduced in the process of removing the first photoresist pattern 731. This may result in the formation of a second sub-photoresist pattern 733a and a third sub-photoresist pattern 735a thinner than the second photoresist pattern 733 and the third photoresist pattern 735.

Figure 35:
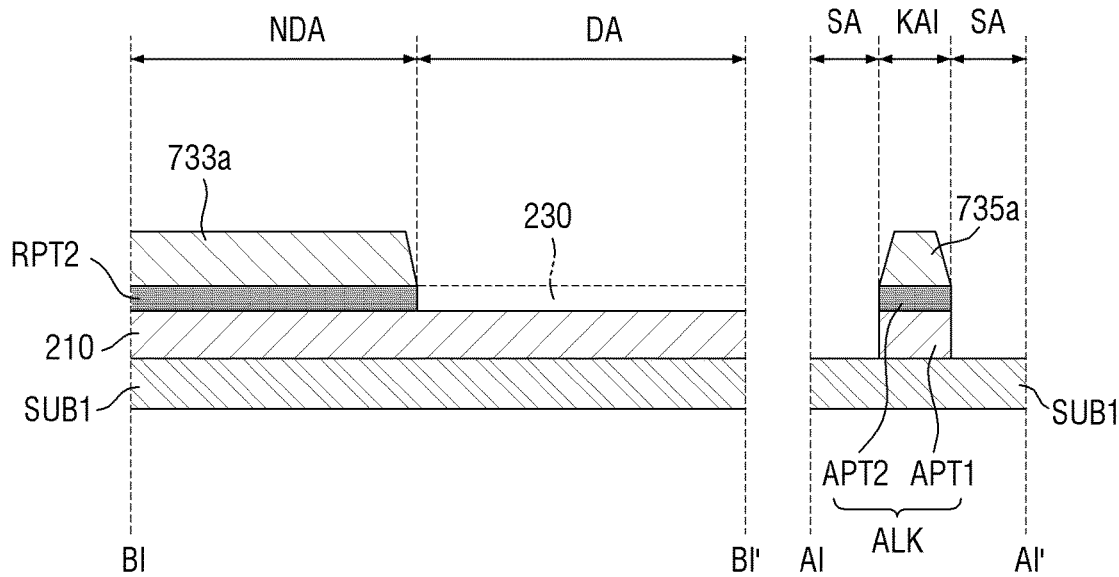

Referring to FIG. 35, the second material layer 230 may be etched using the second sub-photoresist pattern 733a and the third sub-photoresist pattern 735a as an etch mask. Accordingly, a portion of the second material layer 230 which corresponds to the display area DA may be removed, and an upper reflective pattern RPT2 may be formed between the second sub-photoresist pattern 733a and the first material layer 210. A portion of the first material layer 210 which corresponds to the display area DA may not be etched in the process of removing the second material layer 230.

Figure 36:
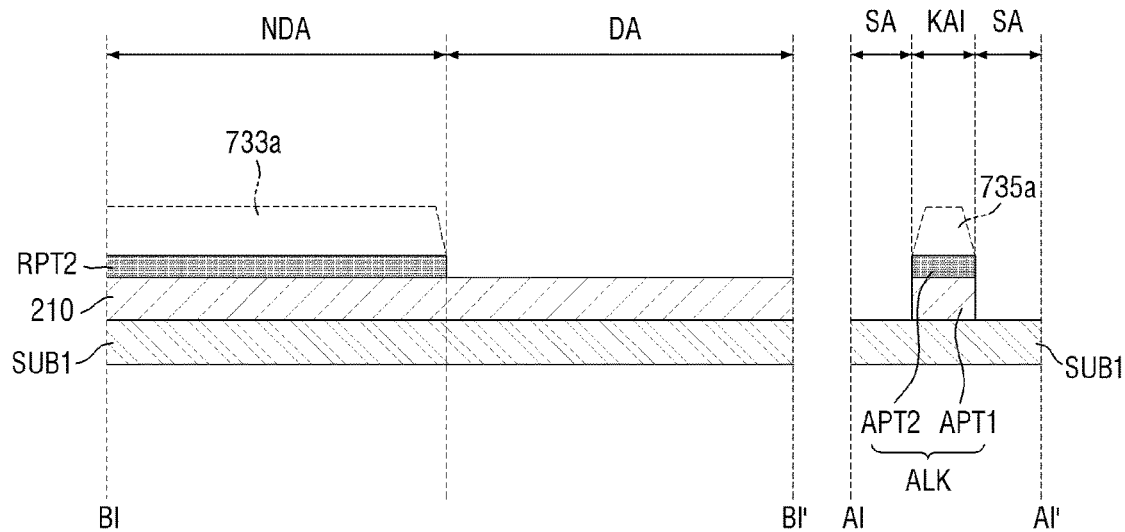
Figure 37:
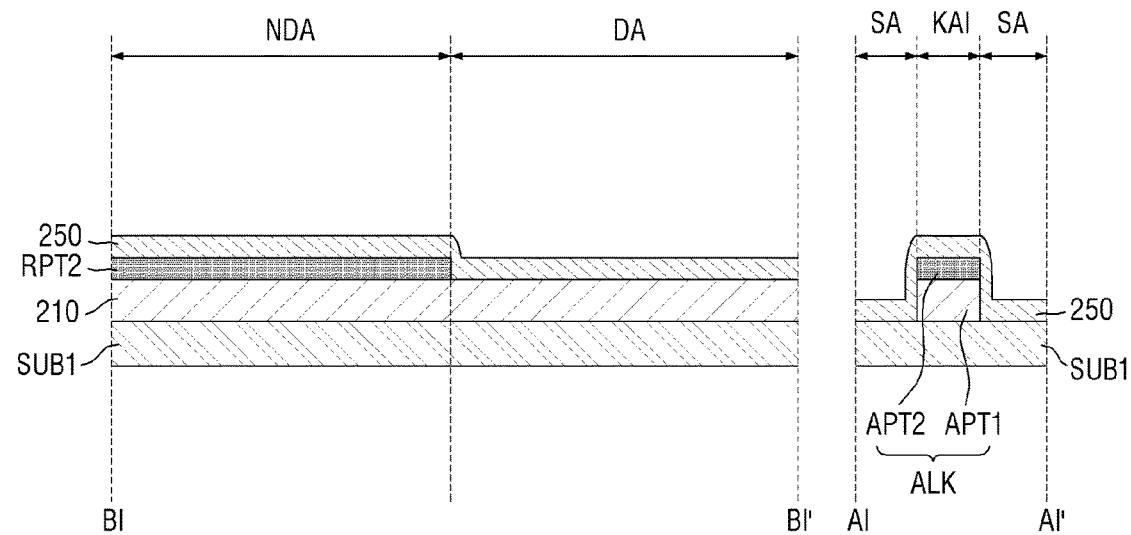

Referring to FIG. 36, the second sub-photoresist pattern 733a and the third sub-photoresist pattern 735a are removed. Referring to FIG. 37, a hard mask layer 250 may be formed on the whole surface of the first base substrate SUB1 to cover the first material layer 210, the upper reflective pattern RPT2, and the align key ALK. The hard mask layer 250 may include an inorganic insulating material such as silicon nitride or silicon oxide.

Figure 38:
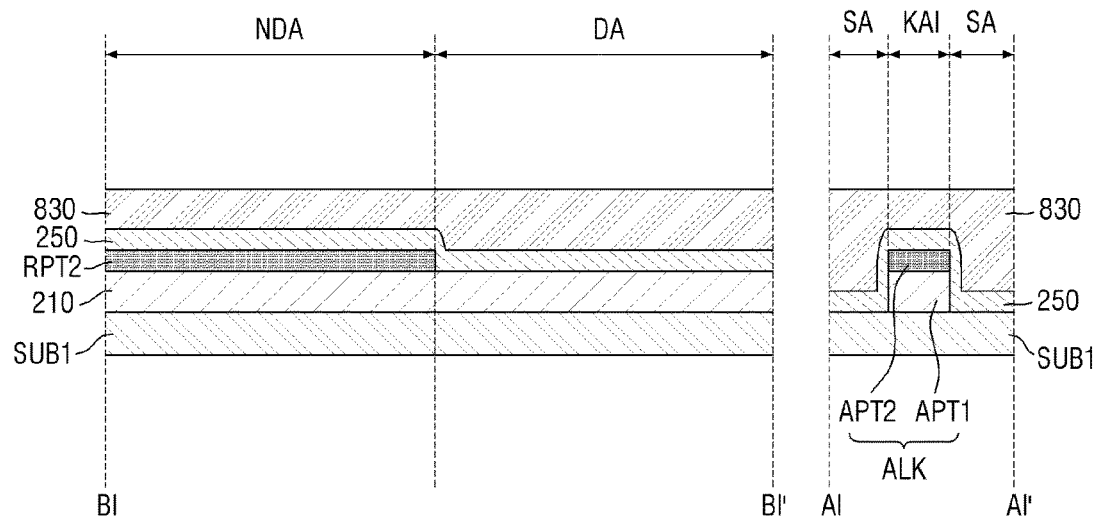

Referring to FIG. 38, a resin layer 830 may be formed on the whole surface of the first base substrate SUB1 to cover the hard mask layer 250. The upper reflective pattern RPT2 may be located on a portion of the first material layer 210 which corresponds to the non-display area NDA. Accordingly, a portion of the resin layer 830 which corresponds to the display area DA may be thicker than a portion of the resin layer 830 which corresponds to the non-display area NDA.

Figure 39:
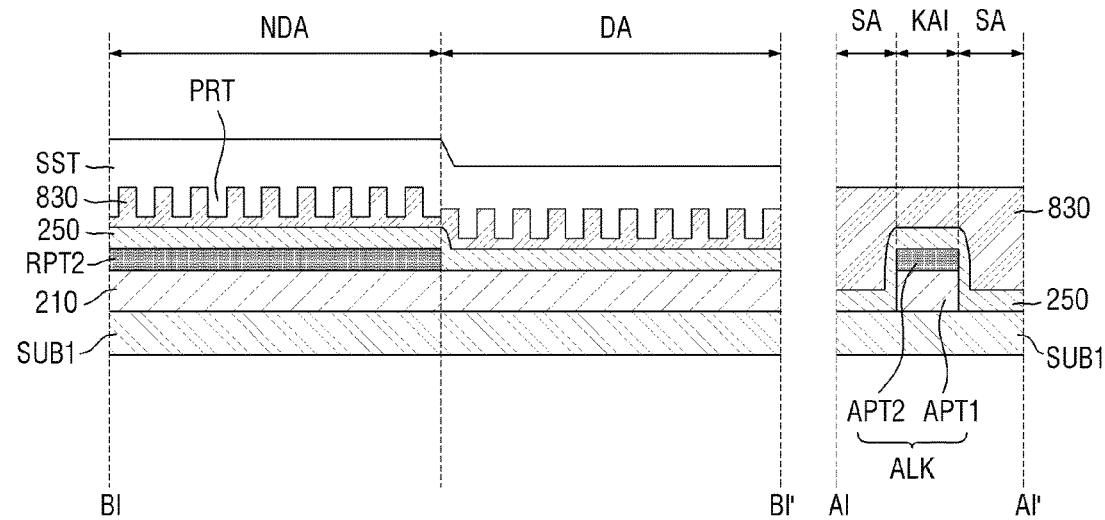

Referring to FIG. 39, a soft stamp SST having protruding and recessed patterns PRT may be pressed against an upper surface of the resin layer 830 to transfer inverted patterns of the protruding and recessed patterns PRT onto the resin layer 830. Here, the soft stamp SST may be flexible and can be bent or crooked in the pattern transfer process.

Figure 40:
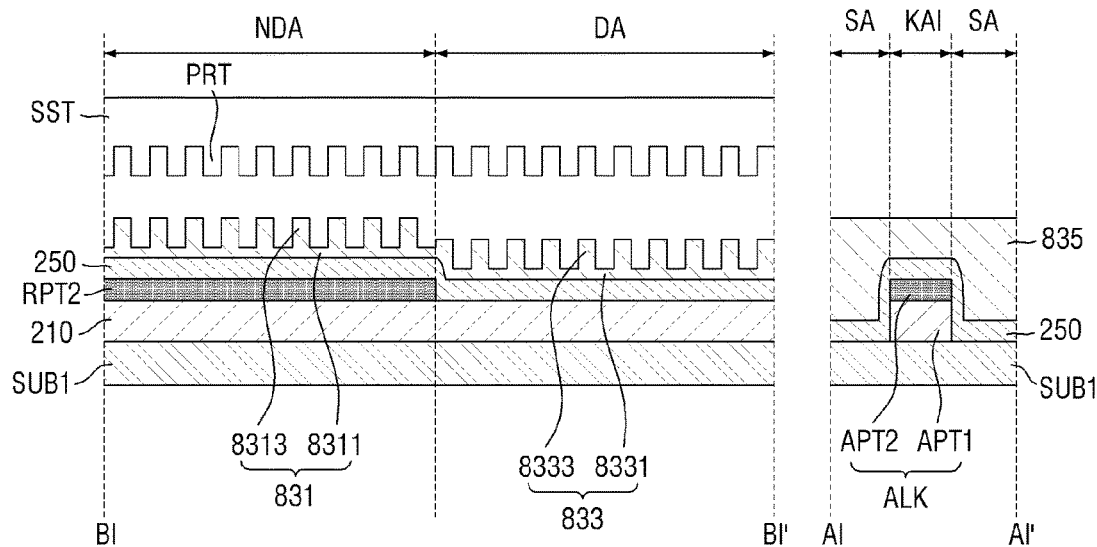

Referring to FIG. 40, the soft stamp SST may be separated from the resin layer 830, and then the resin layer 830 may be cured to form a first resin pattern 831, a second resin pattern 833, and a third resin pattern 835. The first resin pattern 831 may include a first bottom part 8311 located on the hard mask layer 250 and a plurality of first patterns 8313 located on the first bottom part 8311, and the second resin pattern 833 may include a second bottom part 8331 located on the hard mask layer 250 and a plurality of second patterns 8333 located on the second bottom part 8331.

Since the soft stamp SST may be flexible as described above, it can be bent or crooked in the pattern transfer process. Accordingly, even if a step difference exists under the resin layer 830 due to the upper reflective pattern RPT2, uniform pressure can be applied to the portion of the resin layer 830 which corresponds to the non-display area NDA and the portion of the resin layer 830 which corresponds to the display area DA. Accordingly, a thickness of the first bottom part 8311 may be substantially equal or similar to that of the second bottom part 8331.

Figure 41:
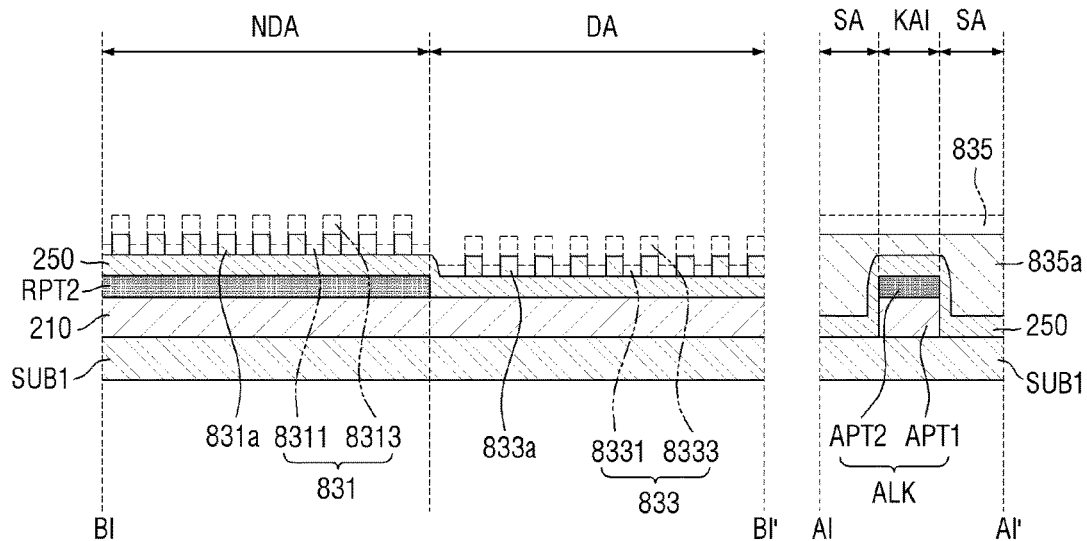

Referring to FIG. 41, the second bottom part 8331 of the second resin pattern 833 may be removed using an ashing process or a dry-etching process. A thickness of each of the second patterns 8333 may be reduced in the process of removing the second bottom part 8331. As a result, second sub-resin patterns 833a may be formed. The removal of the second bottom part 8331 may partially expose a portion of the hard mask layer 250 which corresponds to the display area DA, more specifically, may expose the hard mask layer 250 between the second sub-resin patterns 833a. The first resin pattern 831 and the third resin pattern 835 may also be partially removed in the process of removing the second bottom part 8331. As described above, the thickness of the first bottom part 8311 of the first resin pattern 831 may be substantially equal to that of the second bottom part 8331 of the second resin pattern 833. Therefore, when the second bottom part 8331 may be removed, the first bottom part 8311 may also be removed. As a result, first sub-resin patterns 831a formed by partially removing the first patterns 8313 may be disposed in the portion corresponding to the non-display area NDA. Therefore, a portion of the hard mask layer 250 which corresponds to the non-display area NDA may be partially exposed. More specifically, the hard mask layer 250 located between the first sub-resin patterns 831a may be exposed. In addition, a third sub-resin pattern 835a formed by partially removing the third resin pattern 835 may be disposed in the portion corresponding to the first align key area KAI and the surrounding area SA.

Figure 42:
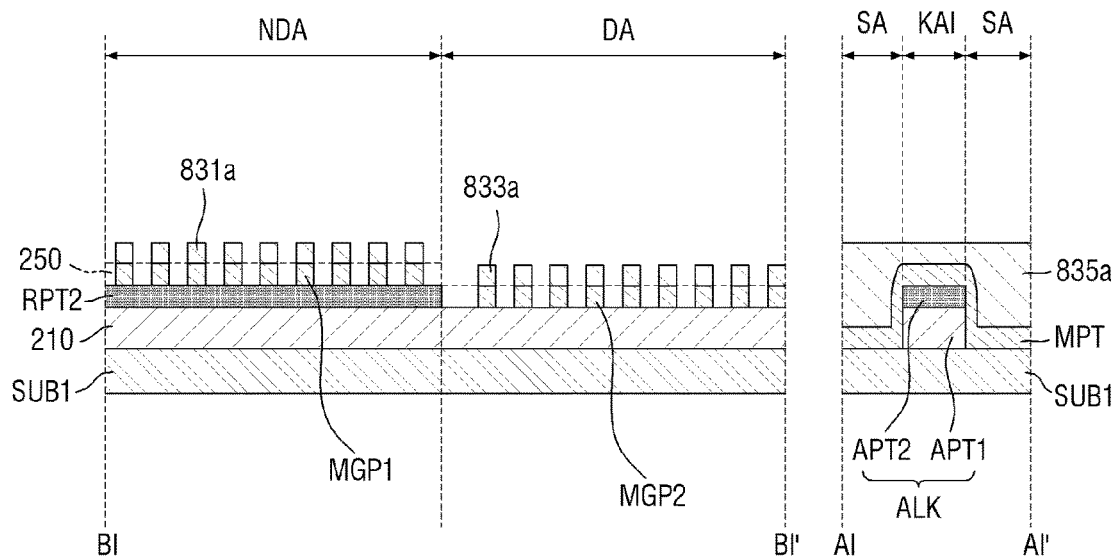

Referring to FIG. 42, the hard mask layer 250 may be etched using the first sub-resin patterns 831a, the second sub-resin patterns 833a, and the third sub-resin pattern 835a as an etch mask. Accordingly, portions of the hard mask layer 250 which are not covered by the first sub-resin patterns 831a and the second sub-resin patterns 833a may be removed, resulting in the formation of first residual mask grid patterns MGP1 on the upper reflective pattern RPT2 and second residual mask grid patterns MGP2 on the first material layer 210 which corresponds to the display area DA. In addition, a residual mask pattern MPT may be formed on the align key ALK.

Figure 43:
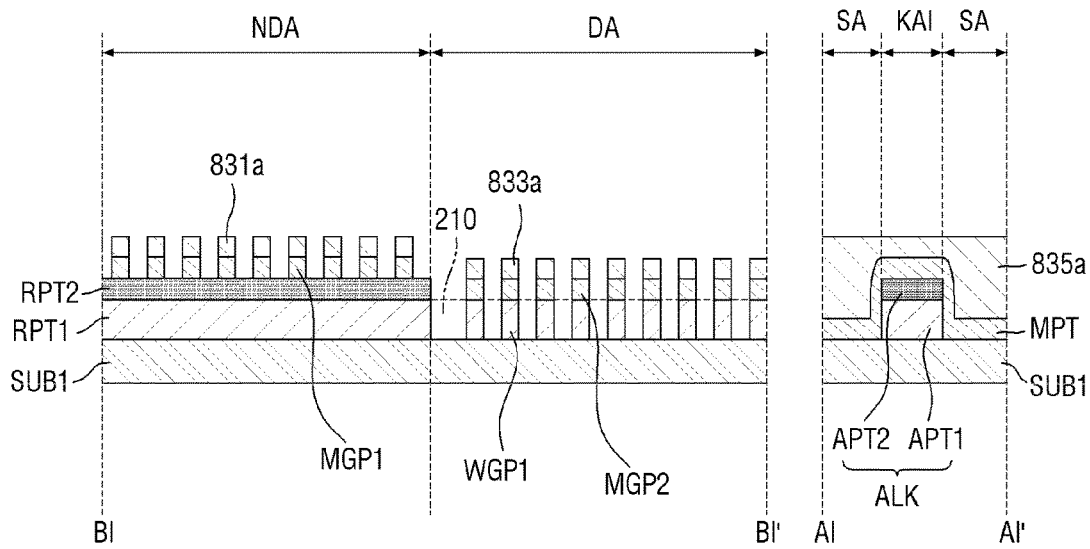

Referring to FIG. 43, the first material layer 210 may be etched using the upper reflective pattern RPT2, the second sub-resin patterns 813a, the third sub-resin pattern 815a, and the second residual mask grid patterns MGP2 as an etch mask. Accordingly, a lower reflective pattern RPT1 may be formed in a portion of the first material layer 210 which may be covered by the upper reflective pattern RTP2, and lower grid patterns WGP1 may be formed in portions of the first material layer 210 which are covered by the second sub-resin patterns 813a or the second residual mask grid patterns MGP2. As described above, the second material included in the upper reflective pattern RPT2 and the first material included in the first material layer 210 may have different etch rates. Accordingly, the upper reflective pattern RPT2 may serve as a mask in the process of etching the first material layer 210.

Next, the first polarizing member PL1b and the align key ALK illustrated in FIG. 7 may be formed by removing the first sub-resin patterns 831a, the second sub-resin patterns 833a, and the third sub-resin pattern 835a. In addition, the first polarizing member PL1c and the align key ALK illustrated in FIG. 8 may be formed by removing the first sub-resin patterns 831a, the second sub-resin patterns 833a and the third sub-resin pattern 835a and further removing the first residual mask grid patterns MGP1, the second residual mask grid patterns MGP2, and the residual mask pattern MPT.

FIGS. 44 through 48 are cross-sectional views illustrating an example method of manufacturing the first polarizing member PL1c and the align key ALK of FIG. 8. For simplicity, a description of elements substantially identical to those described above will be given briefly or omitted.

Figure 44:
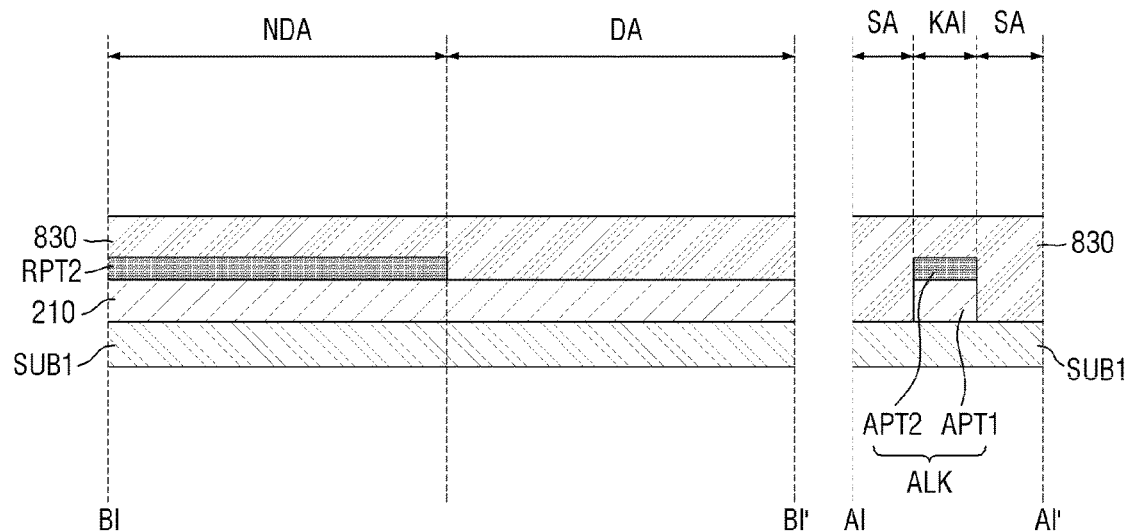
FIG. 44, FIG. 45, FIG. 46, FIG. 47, and FIG. 48 are cross-sectional views illustrating an exemplary embodiment of a method of manufacturing the first polarizing member and the align key of FIG. 8.

Referring to FIG. 44, a first material layer 210 may be formed on the whole surface of a first base substrate SUB1, an upper reflective pattern RPT2 may be formed on the first material layer 210 which corresponds to a non-display area NDA, and an align key ALK may be formed on the first base substrate SUB1 which corresponds to a first align key area KAI. The process of manufacturing the above elements may be the same as the process described above with reference to FIGS. 30 through 36, and thus a description thereof will be omitted.

Next, a resin layer 830 may be formed on the whole surface of the first base substrate SUB1 to cover the first material layer 210, the upper reflective pattern RPT2, and the align key ALK. Due to the upper reflective pattern RPT2, a portion of the resin layer 830 which corresponds to a display area DA may be greater than that of a portion of the resin layer 830 which corresponds to the non-display area NDA.

Figure 45:
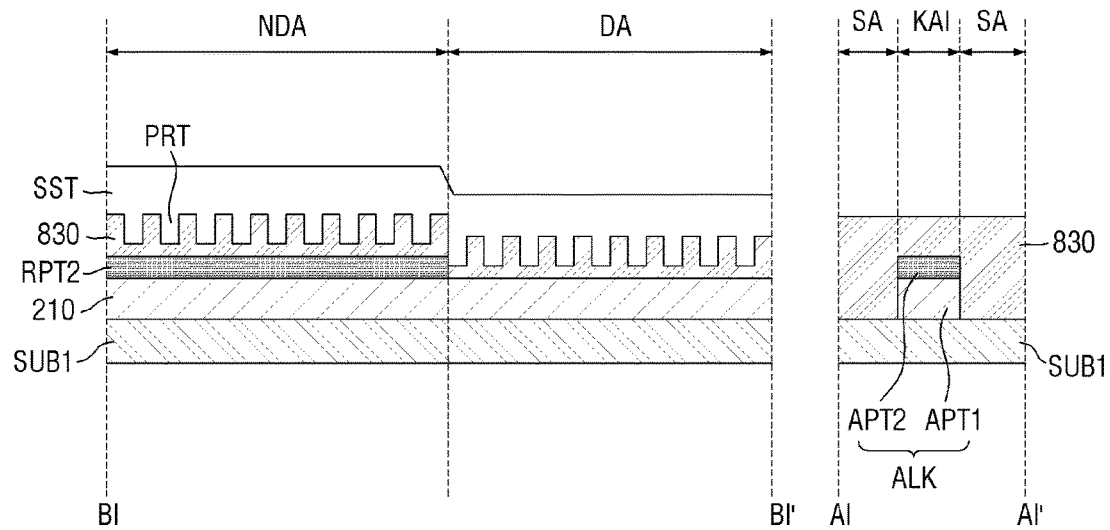

Referring to FIG. 45, a soft stamp SST having protruding and recessed patterns PRT may be pressed against an upper surface of the resin layer 830 to transfer inverted patterns of the protruding and recessed patterns PRT onto the resin layer 830.

Figure 46:
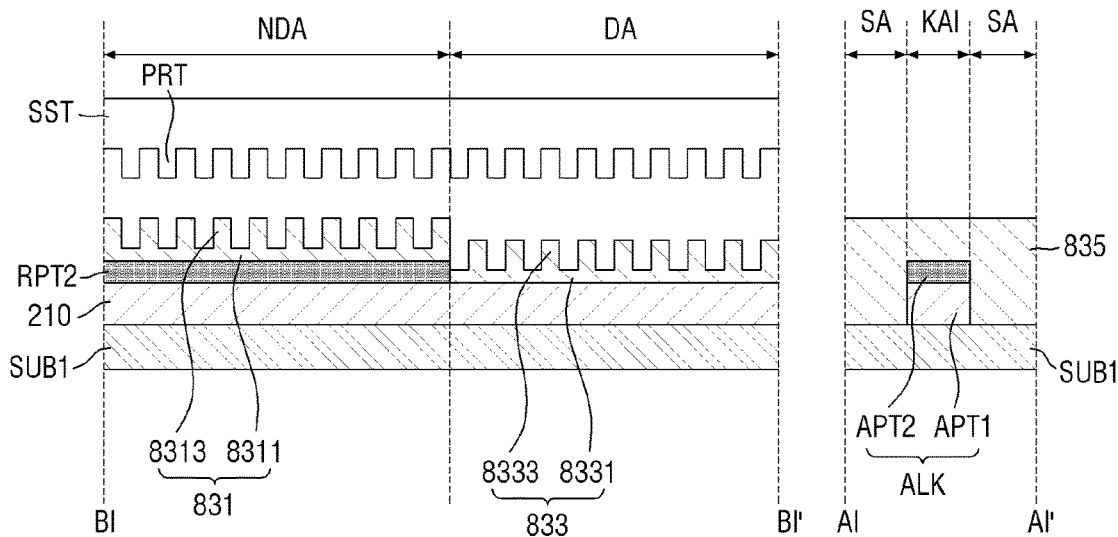

Referring to FIG. 46, the soft stamp SST may be separated from the resin layer 830, and then the resin layer 830 may be cured to form a first resin pattern 831, a second resin pattern 833, and a third resin pattern 835. The first resin pattern 831 may include a first bottom part 8311 located on the upper reflective pattern RPT2 and a plurality of first patterns 8313 located on the first bottom part 8311, and the second resin pattern 833 may include a second bottom part 8331 located on the first material layer 210 and a plurality of second patterns 8333 located on the second bottom part 8331.

Figure 47:
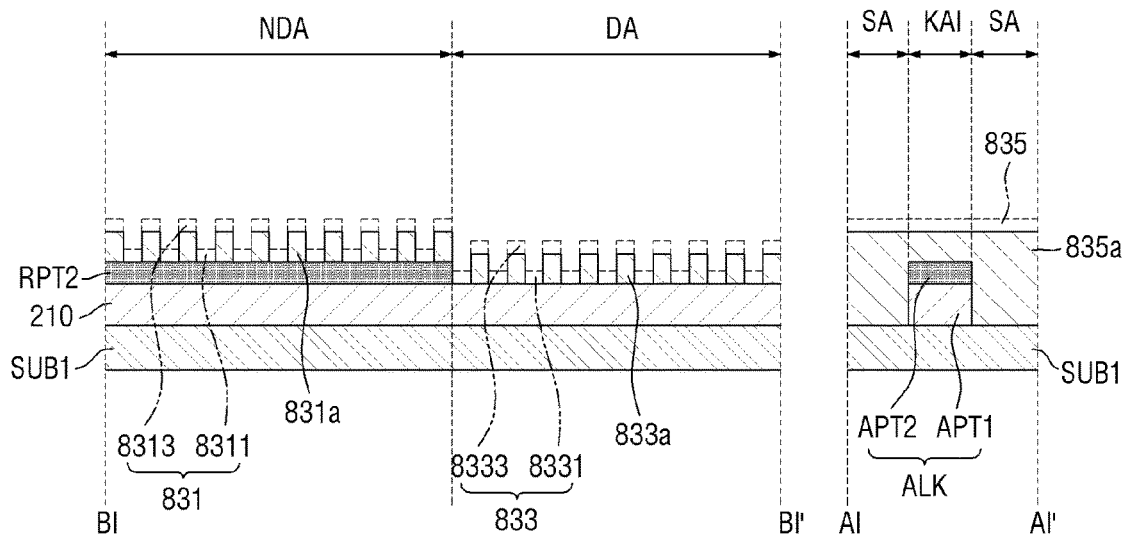

Referring to FIG. 47, the second bottom part 8331 of the second resin pattern 833 may be removed using an ashing process or a dry-etching process. As a result, the first material layer 210 may be partially exposed. In the process of removing the second bottom part 8331, the second patterns 8333 may be partially removed to form second sub-resin patterns 833a, and the first resin pattern 831 may be partially removed to form first sub-resin patterns 831a and a third sub-resin pattern 835a. As the first resin pattern 831 may be partially removed, the upper reflective pattern RPT2 may also be partially exposed.

Figure 48:
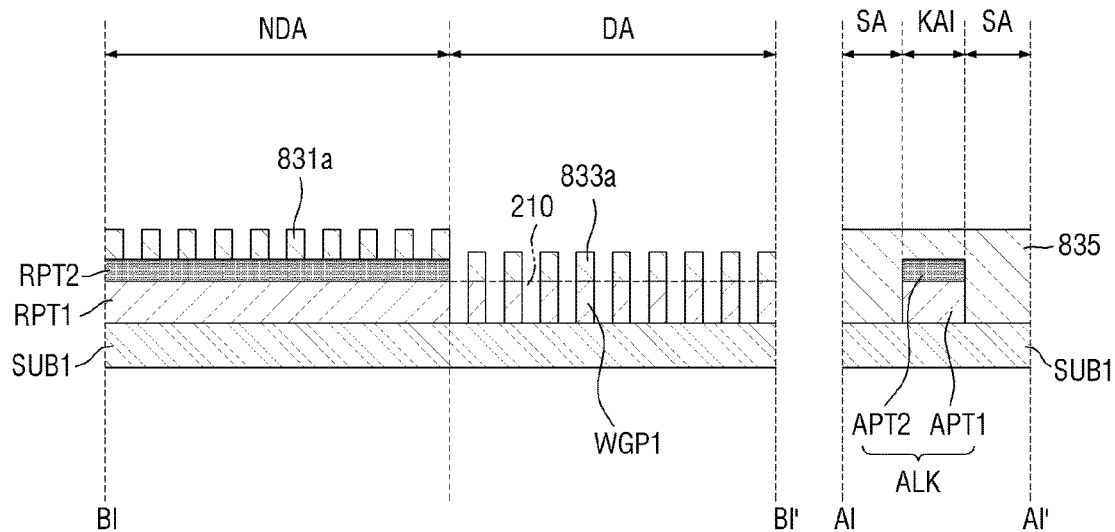

Referring to FIG. 48, the first material layer 210 may be etched using the upper reflective pattern RPT2, the second sub-resin patterns 833a and the third sub-resin pattern 835a as an etch mask. Accordingly, a lower reflective pattern RPT1 may be formed in a portion of the first material layer 210 which may be covered by the upper reflective pattern RPT2, and lower grid patterns WGP1 may be formed in portions of the first material layer 210 which are covered by the second sub-resin patterns 813a.

According to the manufacturing method described above, a reflective part and a polarizing part of a first polarizing member can be formed using one mask in the process of manufacturing a display panel. Therefore, the number of masks used in the manufacturing process can be reduced. In addition, according to the manufacturing method, an align key as well as a first polarizing member including a reflective part and a polarizing part can be formed using one mask in the process of manufacturing a mother substrate for display panels. Accordingly, the number of masks used in the process of manufacturing a mother substrate for display panels can be reduced.

Further, if a hard mask layer may be not formed in the manufacturing process, the manufacturing process can be simplified.

Figure 49:
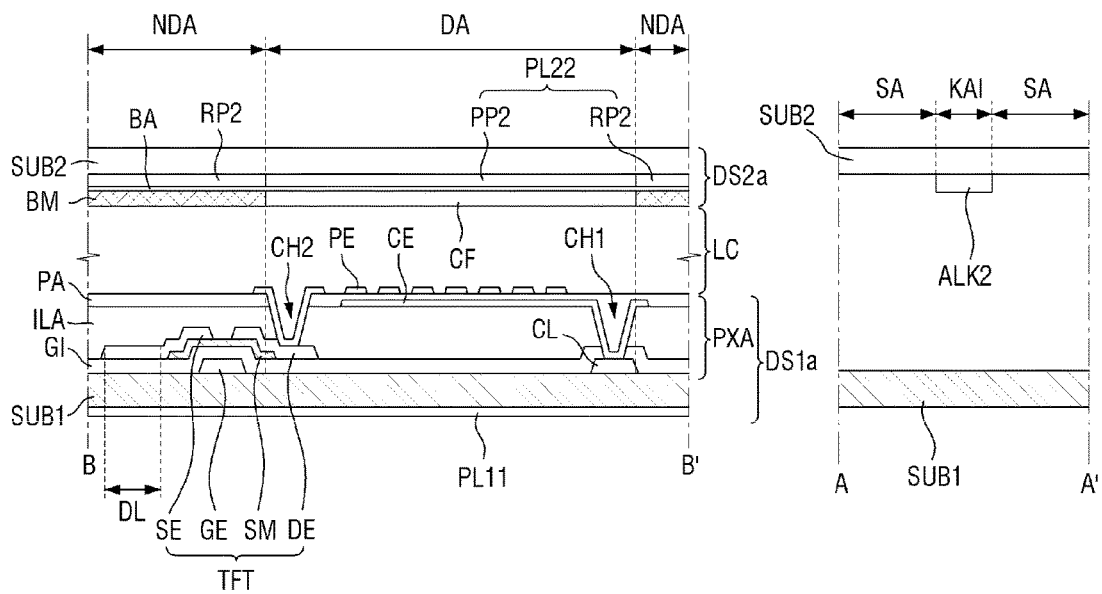
FIG. 49 is a cross-sectional view of a modified exemplary embodiment of FIG. 4.

FIG. 49 is a cross-sectional view of a modified embodiment of FIG. 4. For simplicity, a redundant description of elements described above will be omitted, and the current modified embodiment will hereinafter be described, focusing mainly on differences with the embodiment of FIG. 4.

Referring to FIGS. 1 through 3 and 49, a first display substrate DS1a may include a first base substrate SUB1, a first polarizing member PL11, and a pixel array layer PXA. For simplicity, a redundant description of elements described above will be omitted, and the current modified embodiment will hereinafter be described, focusing mainly on differences with the embodiment of FIG. 4.

First, the first display substrate DS1a will be described.

The pixel array layer PXA may be located on a surface of the first base substrate SUB1.

The first polarizing member PL11 may be located on the other surface of the first base substrate SUB1 which may be opposite the surface of the first base substrate SUB1. The first polarizing member PL11 may be a stretchable polarizing film. The stretchable polarizing film may include a PVA-based polarizer to which an iodine compound or a dichromatic polarizing material may be adsorbed and which may be stretched in a direction and a triacetyl cellulose protective film which protects the polarizer.

Other elements of the first display substrate DS1a are identical or similar to those described above with reference to FIGS. 1 through 4, and thus a description thereof is omitted.

Next, a second display substrate DS2a will be described.

The second display substrate DS2a may include a second base substrate SUB2, a second polarizing member PL22, a base insulating layer BA, a light-blocking member BM, and a color filter CF.

The second polarizing member PL22 may be located on a surface of the second base substrate SUB2 and include a reflective part RP2 and a polarizing part PP2.

The polarizing part PP2 may overlap a display area DA of the first base substrate SUB1, and the reflective part RP2 may overlap a non-display area NDA of the first base substrate SUB1. The specific structure of the second polarizing member PL22 may be substantially identical to the structure of the first polarizing member PL1 of FIG. 5 or the structure of the first polarizing member PL1a of FIG. 6. For example, the structure of the reflective part RP2 of the second polarizing member PL22 may be substantially identical to the structure of the reflective part RP described above with reference to FIG. 5 or the structure of the reflective part RPa described above with reference to FIG. 6. In addition, the structure of the polarizing part PP2 of the second polarizing member PL22 may be substantially identical to the structure of the polarizing part PP described above with reference to FIG. 5 or the structure of the polarizing part PPa described above with reference to FIG. 6. Therefore, a detailed description io of the structures of the reflective part RP2 and the polarizing part PP2 of the second polarizing member PL22 will be omitted.

The base insulating layer BA may be located on the second polarizing member PL22. The base insulating layer BA may be made of an insulating material and cover the whole of the second polarizing member PL22. In some embodiments, the base insulating layer BA can be omitted.

The light-blocking member BM and the color filter CF may be located on the base insulating layer BA. In some embodiments, if the base insulating layer BA may be omitted, the light-blocking member BM and the color filter CF may be located on the second polarizing member PL22.

An align key ALK2 may be disposed on the surface of the second base substrate SUB2 to correspond to a first align key area KAI. The align key ALK2 may be as a basis for aligning the first display substrate DS1a and the second display substrate DS2a with each other from the perspective of a display panel DP.

Figure 50:
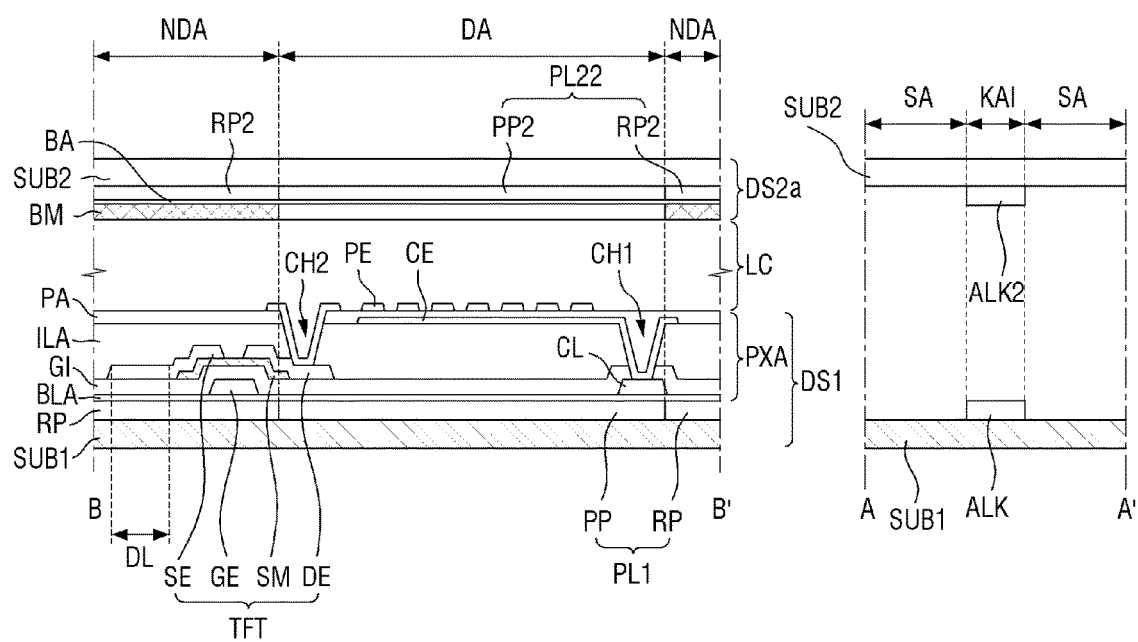
FIG. 50 is a cross-sectional view of another modified exemplary embodiment of FIG. 4.

FIG. 50 is a cross-sectional view of another modified embodiment of FIG. 4.

Referring to FIGS. 1 through 3 and 50, a first display substrate DS1 may include a first base substrate SUB1, a first polarizing member PL1, a base insulating layer BLA, and a pixel array layer PXA as described above with reference to FIG. 4.

A second display substrate DS2a may include a second base substrate SUB2, a second polarizing member PL22, a base insulating layer BA, a light-blocking member BM, and a color filter CF as described above with reference to FIG. 49. A detailed description of the first display substrate DS1 may be the same as the description of the first display substrate DS1 illustrated in FIG. 4, and a detailed description of the second display substrate DS2a may be the same as the description of the second display substrate DS2a illustrated in FIG. 49. Therefore, a detailed description of the first display substrate DS1 and the second display substrate DS2a will be omitted.

An align key ALK may be disposed on a surface of the first base substrate SUB1 to correspond to a first align key area KAI. In addition, an align key ALK2 may be disposed on a surface of the second base substrate SUB2 to correspond to the first align key area KAI. The align key ALK2 and the align key ALK may be used as a basis for aligning the first display substrate DS1 and the second display substrate DS2a with each other from the perspective of a display panel DP.

According to embodiments of the present disclosure, a display panel and a mother substrate for display panels which can reduce the number of masks used in a manufacturing process can be provided.

However, the effects of the present disclosure are not restricted to the one set forth herein. The above and other effects of the present disclosure will become more apparent to one of daily skill in the art to which the present disclosure pertains by referencing the claims.

Although the exemplary embodiments of the present disclosure have been disclosed for illustrative purposes, the embodiments are only exemplified, but do not limit the present disclosure. Those skilled in the art will appreciate that various modifications and applications are possible, without departing from the scope and spirit of the disclosure as disclosed in the accompanying claims. For example, each element specified in embodiments of the present disclosure can be variously modified and implemented. Further, differences related to such modifications and applications should be interpreted as being included in the scope of the present disclosure defined by the accompanying claims.

What is claimed is:

1. A mother substrate for display panels, the mother substrate comprising:
    a base substrate which comprises a panel area comprising a display area and a non-display area, an align key area, and a surrounding area of the panel area and the align key area; and
    a polarizing member disposed on a surface of the base substrate and comprising a plurality of grid patterns overlapping the display area, a reflective pattern overlapping the non-display area, and an align key overlapping the align key area,
    wherein a first height from the surface of the base substrate to an upper surface of the reflective pattern is different from a second height from the surface of the base substrate to upper surfaces of the grid patterns, and a third height from the surface of the base substrate to an upper surface of the align key is equal to the first height or the second height.

2. The mother substrate of claim 1, wherein the second height is greater than the first height, and the third height is equal to the second height.

3. The mother substrate of claim 2, wherein the grid patterns comprise:
lower grid patterns disposed on the surface of the base substrate and comprising the same first material as the reflective pattern, and
upper grid patterns disposed on the lower grid patterns and comprising a second material different from the first material; and
the align key comprises:
a lower align key pattern disposed on the surface of the base substrate and comprising the first material, and
an upper align key pattern disposed on the lower align key pattern and comprising the second material.

4. The mother substrate of claim 3, wherein a height from the surface of the base substrate to an upper surface of the lower align key pattern is equal to the first height.

5. The mother substrate of claim 3, further comprising:
a first residual mask pattern disposed on the reflective pattern;
residual mask grid patterns disposed on the upper grid patterns; and
a second residual mask pattern disposed on the upper align key pattern.

6. The mother substrate of claim 1, wherein the first height is greater than the second height, and the third height is equal to the first height.

7. The mother substrate of claim 6, wherein the reflective pattern comprises:
a lower reflective pattern disposed on the surface of the base substrate and comprising the same first material as the grid patterns, and
an upper reflective pattern disposed on the lower reflective pattern and comprising a second material different from the first material; and
the align key comprises:
a lower align key pattern disposed on the surface of the base substrate and comprising the first material, and
an upper align key pattern disposed on the lower align key pattern and comprising the second material.

8. The mother substrate of claim 7, wherein a height from the surface of the base substrate to an upper surface of the lower align key pattern is equal to the second height.

9. The mother substrate of claim 7, further comprising:
first residual mask grid patterns disposed on the upper reflective pattern; and
second residual mask grid patterns disposed on the grid patterns; and
a residual mask pattern disposed on the upper align key pattern.

* * * * *